United States Patent
Feng et al.

(10) Patent No.: US 11,892,565 B2
(45) Date of Patent: Feb. 6, 2024

(54) CONTROLLING DIRECTION OF LIDAR OUTPUT SIGNALS

(71) Applicant: SiLC Technologies, Inc., Monrovia, CA (US)

(72) Inventors: Dazeng Feng, El Monte, CA (US); Bradley Jonathan Luff, La Canada Flintridge, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1050 days.

(21) Appl. No.: 16/600,492

(22) Filed: Oct. 12, 2019

(65) Prior Publication Data

US 2021/0109195 A1 Apr. 15, 2021

Related U.S. Application Data

(60) Provisional application No. 62/745,207, filed on Oct. 12, 2018.

(51) Int. Cl.
| | |
|---|---|
| *G01S 7/481* | (2006.01) |
| *G02F 1/29* | (2006.01) |
| *G02F 1/313* | (2006.01) |
| *G01S 3/802* | (2006.01) |
| *G01S 3/788* | (2006.01) |

(52) U.S. Cl.
CPC ............ *G01S 7/4814* (2013.01); *G01S 3/788* (2013.01); *G01S 3/802* (2013.01); *G01S 3/8022* (2013.01); *G02F 1/292* (2013.01); *G02F 1/313* (2013.01)

(58) Field of Classification Search
CPC ........ G01S 7/4814; G01S 3/802; G01S 3/788; G01S 3/8022; G01S 7/4817; G01S 7/4818; G01S 17/34; G02F 1/313; G02F 1/292

USPC .......................................................... 356/487
See application file for complete search history.

(56) References Cited

U.S. PATENT DOCUMENTS

| | | | |
|---|---|---|---|
| 6,040,898 | A | 3/2000 | Mrosik et al. |
| 6,921,490 | B1 | 7/2005 | Qian et al. |
| 9,157,790 | B2 | 10/2015 | Shpunt et al. |
| 9,625,580 | B2 | 4/2017 | Kotelnikov et al. |
| 9,753,351 | B2 | 9/2017 | Eldada |
| 9,841,495 | B2 | 12/2017 | Campbell et al. |
| 2009/0195769 | A1 | 8/2009 | Luo et al. |
| 2015/0177383 | A1 | 6/2015 | Ruff et al. |
| 2016/0299228 | A1 | 10/2016 | Maleki et al. |

(Continued)

OTHER PUBLICATIONS

Day, I.E., et al., (2002). "Solid state absorption attenuator in silicon-on-insulator with MHz bandwidth. OSA Trends in Optics and Photonics, 78—Integrated Photonics Research", OSA Technical Digest, (pp. IFA5_1-IFA5_3).

(Continued)

*Primary Examiner* — Daniel L Murphy
(74) *Attorney, Agent, or Firm* — Gavrilovich, Dodd & Lindsey LLP

(57) ABSTRACT

A LIDAR system includes a waveguide array configured to output a LIDAR output signal such that the LIDAR output signal is reflected by an object located off the LIDAR chip. The system also includes electronics configured to tune a wavelength of the LIDAR output signal such that the direction that the LIDAR output signal travels away from the LIDAR chip changes in response to the tuning of the wavelength by the electronics.

12 Claims, 12 Drawing Sheets

(56) References Cited

U.S. PATENT DOCUMENTS

| | | | |
|---|---|---|---|
| 2017/0067985 A1 | 3/2017 | Schwarz et al. | |
| 2017/0184450 A1* | 6/2017 | Doylend | G01B 11/22 |
| 2017/0269198 A1 | 9/2017 | Hall et al. | |
| 2017/0299697 A1* | 10/2017 | Swanson | G01N 21/17 |
| 2017/0343652 A1 | 11/2017 | De Mersseman et al. | |
| 2019/0101647 A1* | 4/2019 | Feshali | G01S 17/42 |
| 2019/0346056 A1 | 11/2019 | Staiger et al. | |
| 2019/0346568 A1 | 11/2019 | Feng et al. | |
| 2019/0369244 A1 | 12/2019 | Asghari et al. | |
| 2019/0391242 A1 | 12/2019 | Asghari et al. | |
| 2020/0363515 A1* | 11/2020 | Luff | G01S 17/931 |

OTHER PUBLICATIONS

Li, L., (Jan. 2014), "Time of Flight Camera—An Introduction", TI Technical White Paper, SLOA190B.

Poulton, C. V. (2016). MSc Thesis, "Integrated LIDAR with Optical Phased Arrays in Silicon Photonics. Massachusetts Institute of Technology".

Smit, Meint K. C. v. (1996). "Phasar-Based WDM-Devices: Principles, Design and Applications," IEEE Journal of Selected Topics in Quantum Electronics, 2(2), 236-250.

Sun, J., et al., "Large-scale silicon photonic circuits for optical phased arrays," vol. 20, No. 4, Jul./Aug. 2014. IEEE Journal of Selected Topics in Quantum Electronics, 820115.

Van Acoleyen et al., (2009). Off-chip beam steering with a one-dimensional optical phased array on silicon-on-insulator. Opt. Lett. 34, 34, 1477.

Van Acoleyen et al., "Two-Dimensional Dispersive Off-Chip Beam Scanner Fabricated on Silicon-On-Insulator", 2011, IEEE Photon. Technol. Lett., 23, 1270-1272.

Velodyne, HDL-64E S2 Datasheet, 2017. Retrieved from http://velodynelidar.com/lidar/products/brochure/HDL-64E%20S2%20datasheet_2010_lowres.pdf.

Anderson et al., "Iadar: Frequency-Modulated Continuous Wave Laser Detection And Ranging", Photogrammetric Engineering & Remote Sensing, vol. 83, No. 11, Nov. 2017.

Baghmisheh, B. B., "Chip-scale Lidar" University of California, Berkeley, Jan. 19, 2017, Technical Report No. UCB/EECS-2017-4, http://www2.eecs.berkeley.edu/Pubs/TechRpts/2017/EECS-2017-4.html.

Chan, M.K, "Atmospheric transmission windows for high energy short pulse lasers", Thesis, Naval Postgraduate School, Dec. 2003.

Cooksey, Catherine C. et al., "Reflectance measurements of human skin from the ultraviolet to the shortwave infrared (250 nm to 2500 nm)", 2018.

Copenheaver, Blaine R., International Search Report and Written Opinion, PCT/US2020/033301, International Searching Authority, United States Patent and Trademark Office, dated Oct. 4, 2020.

Farooq, S., "Spectral Reflectance of Land Covers", Retrieved from Department of Geology, Aligharh Muslim University: http://www.geol-amu.org/notes/m1r-1-8.htm, 2019.

Haran, T., "Short-wave infrared diffuse reflectance of Textile Materials", Thesis, Georgia State University, 2008.

Issakov, V., "Radar Systems, Ch. 2. In Microwave Circuits for 24GHz Automotive Radar in Silicon-based Technologies", Berlin Heidelberg: Springer-Verlag, 2010.

Kaasalainen, S., "The multispectral journey of Lidar", Retrieved from GIM International: https://www.gim-international.com/content/article/the-multispectral-journey-of-lidar, Jan. 24, 2019.

Kotthaus, S., et al., "Derivation of an urban materials spectral library through emittance and reflectance spectroscopy", ISPRS Journal of Photogrammetry and Remote Sensing, 94, 2014, 194-212.

Li, L., "Time-of-Flight Camera—An Introduction", TI Technical White Paper SLOA190B, 2014.

Pfennigbauer, M. et al., "Multi-Wavelength Airborne Laser Scanning", ILMF 2011. New Orleans, Feb. 7-9, 2011.

Schulmeister, Karl, "White Paper The new edition of the international laser product safety standard", IEC 60825-1, 2014.

Wojtanowski, J. et al., "Comparison of 905 nm and 1550 nm semiconductor laser rangefinders' performance deterioration due to adverse environmental conditions", Opto-Electronics Review, 22(3), 183-190, 2014.

* cited by examiner

CONTROLLING DIRECTION OF LIDAR OUTPUT SIGNALS

RELATED APPLICATIONS

This Application claims the benefit of U.S. Provisional Patent Application Ser. No. 62/745,207, filed on Oct. 12, 2018, entitled "Controlling Direction of LIDAR Output Signals, and incorporated herein in its entirety.

FIELD

The invention relates to optical devices. In particular, the invention relates to LIDAR systems.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with a LIDAR output signal and measuring the properties of the reflected LIDAR input signal.

Frequency Modulated Continuous Wave (FMCW) is an example of a coherent detection method that can be used for LIDAR applications. The FMCW technique is capable of determining both distance and velocity of an object with a single measurement. Additionally, FMCW techniques have reduced sensitivity to ambient light and light from other LIDAR systems.

During these LIDAR applications, the LIDAR output signal is scanned so the LIDAR output signal is incident on multiple different sample regions in a field of view. Optical Phased Arrays (OPA) have been proposed for moving the LIDAR output signal from one sample region to another sample region. However, these OPAs generally require the use of large numbers of phase tuners in order to tune the direction of the LIDAR output signals. These phase tuners add undesirable complexity and cost to the LIDAR sensor. As a result, there is a need for an improved LIDAR sensor.

SUMMARY

A LIDAR system includes a waveguide array configured to output a LIDAR output signal such that the LIDAR output signal is reflected by an object located off the LIDAR chip. The system also includes electronics configured to tune a wavelength of the LIDAR output signal such that the direction that the LIDAR output signal travels away from the LIDAR chip changes in response to the tuning of the wavelength by the electronics.

DESCRIPTION

A LIDAR system includes a waveguide array configured to output a LIDAR output signal such that the LIDAR output signal is reflected by an object located off the LIDAR chip. The system also includes electronics configured to tune a wavelength of the LIDAR output signal such that the direction that the LIDAR output signal travels away from the LIDAR chip changes in response to the tuning of the wavelength by the electronics. The use of wavelength tuning to change the direction of the LIDAR output signal eliminates the need to use phase tuners in the waveguide array in order tune the direction of the LIDAR output signals. As a result, the LIDAR system has reduced reduced costs and complexity.

Figure 1:
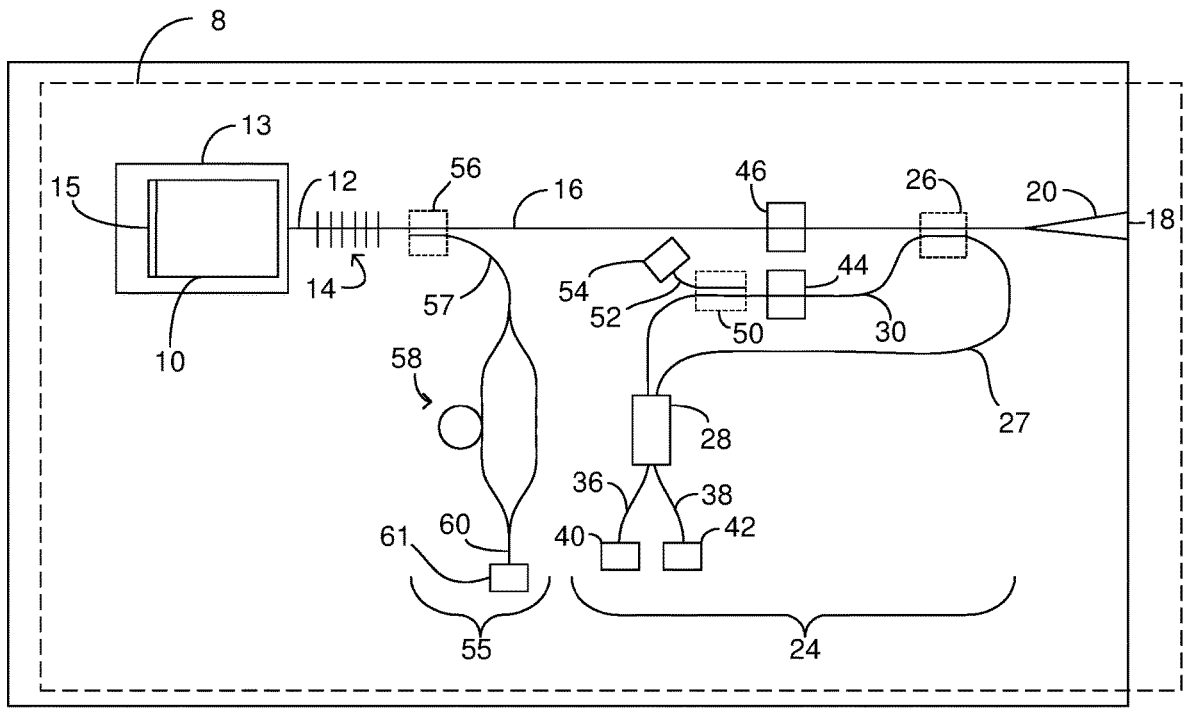
FIG. 1 is a top view of a LIDAR chip.

FIG. 1 is a topview of a LIDAR chip that includes a component assembly 8 with a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal.

The LIDAR output signal travels away from the chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where the optical signals that are processed for LIDAR data are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30 as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off of the chip while the LIDAR output signal has not been reflected. When the chip and the reflecting object are moving relative to one another, the comparative signal and the reference signal have different frequencies due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors include connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving a portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles where each cycle generates LIDAR data (radial velocity and/or distance between a reflecting object and the LIDAR chip) for a sample region in a field of view. During each cycle, the data signal is sampled multiple times. During each of the samples, the electronics tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instances, a cycle includes multiple periods. For instance, a cycle can include a first period and a second period. During the first period, the electronics 62 can increase the frequency of the outgoing LIDAR signal and during a second period the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first period, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first period, the LIDAR output signal travels away from the chip and then returns to the chip as a LIDAR input signal. A portion of the LIDAR input signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second period, the comparative signal enters the light-combining component with a higher frequency than the reference signal concurrently entering the light-combining component and the difference between the frequency of the comparative signal and the frequency of the reference signal during the second period is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the speed the reflecting object is moving toward or away from the chip and/or the speed the chip is moving toward or away from the reflecting object, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

As noted above, the beat frequency is a function of two unknowns; the distance between the chip and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the chip and the reflecting object and c is the speed of light in air. The use of multiple different samples permits the electronics 62 to resolve the two unknowns. For instance, the beat frequency determined for the first period is related to the unknown distance and Doppler contribution and the beat frequency determined for the second period is also related to the unknown distance and Doppler contribution. The availability of the two relationships allows the electronics 62 to resolve the two unknowns. Accordingly, the distance between the chip and the reflecting object can be determined without influence from the Doppler effect. Further, in some instances, the electronics 62 use this distance in combination with the Doppler effect to determine the velocity of the reflecting object toward or away from the chip.

In instances where the relative velocity of target and source is zero or very small, the contribution of the Doppler effect to the beat frequency is essentially zero. In these instances, the Doppler effect does not make a substantial contribution to the beat frequency and the electronics 62 can take only the first period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the sample, the electronics 62 can have a range of suitable values for the electrical control signal magnitude as a function of time. At multiple different times during a sample, the electronics 62 can compare the electrical control signal magnitude to the range of values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instances, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the returned lidar signal can affect the performance of the laser cavity when the power of the returned LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the LIDAR input signal, the magnitude of the sampling signal is related to the power of the LIDAR input signal. This result means the magnitude of the sampling signal is also related to the power of the returned LIDAR signal because the returned LIDAR signal is a portion of the LIDAR input signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal.

Figure 2:
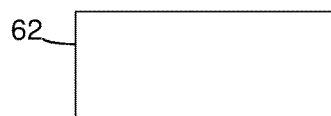
FIG. 2 is a cross-section of a LIDAR chip according to FIG. 1 constructed from a silicon-on-insulator wafer.
Figure 2:
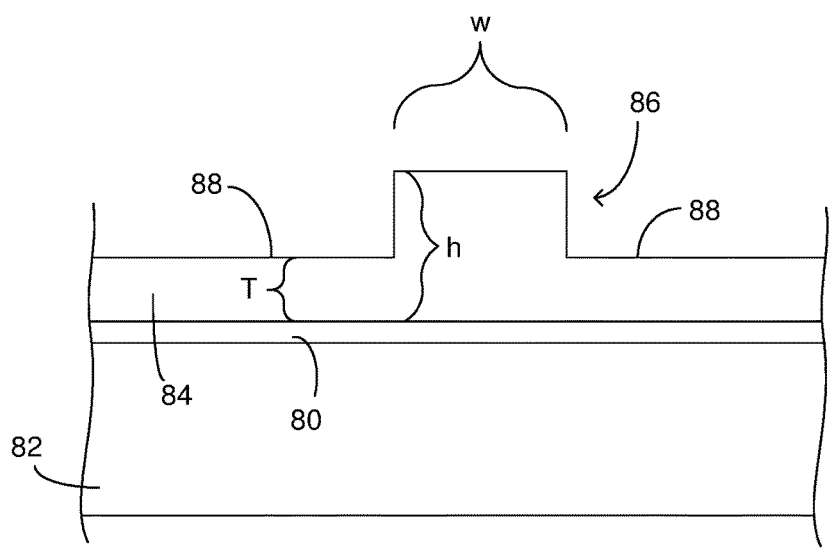

Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 µm and can be in a range of 4 µm to 12 µm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1, 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 61,088,472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguide by forming grooves in the top of the ridge and/or in the later sides of the ridge.

In some instances, it is desirable to scan the LIDAR output signal. The above chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
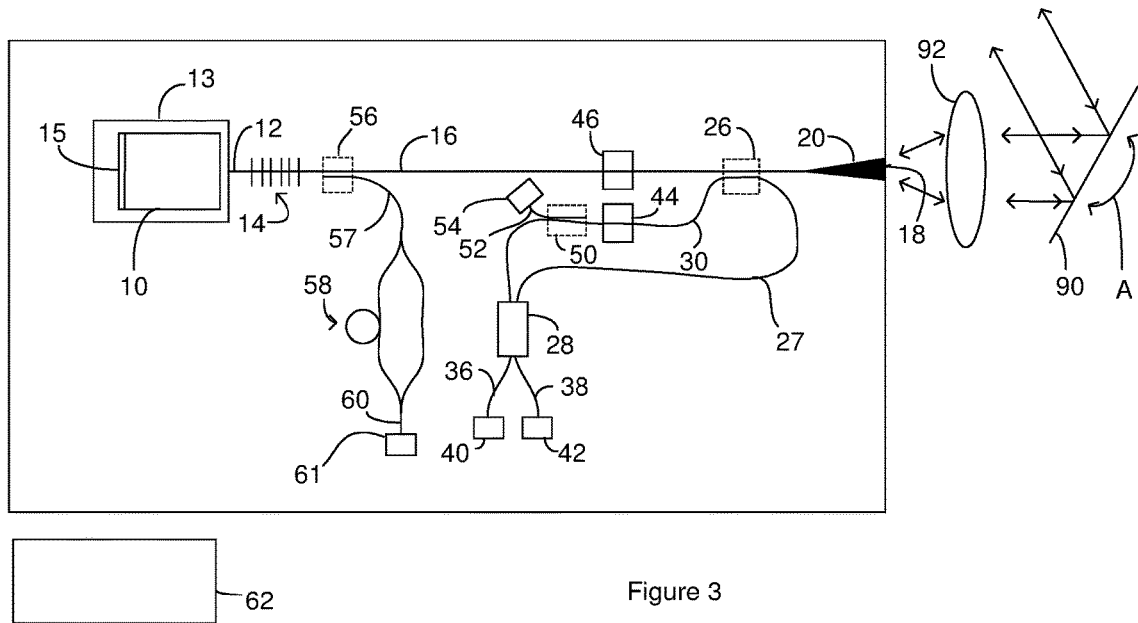
FIG. 3 illustrates the LIDAR chip of FIG. 1 used with an off-chip scanning mechanism.

FIG. 3 illustrates the above chip used with a reflecting device 90 and a collimating device 92. For instance, a lens serves as a collimating device that receives the LIDAR output signal and provides collimation of the LIDAR output signal. A mirror serves as a reflecting device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in two dimensions or three dimensions. Suitable mirrors include, but are not limited to, mechanically driven mirrors and Micro Electro Mechanical System (MEMS) mirrors.

Figure 4:
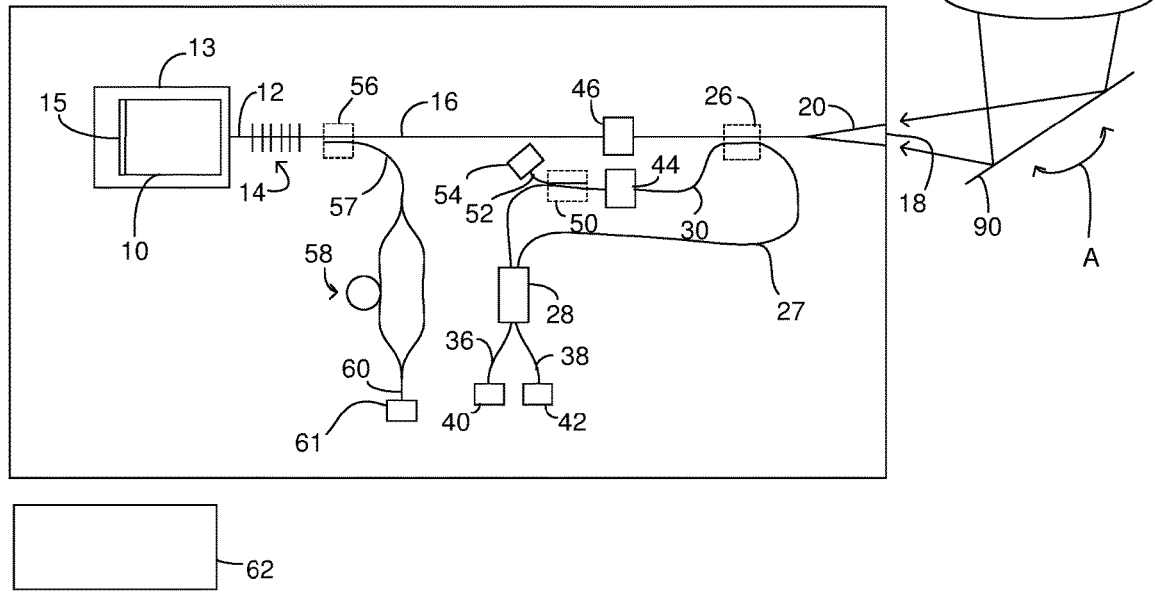
FIG. 4 illustrates the LIDAR chip of FIG. 1 used with another embodiment of an off-chip scanning mechanism.

FIG. 4 illustrates the above chip used with a reflecting device 90 and a collimating device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
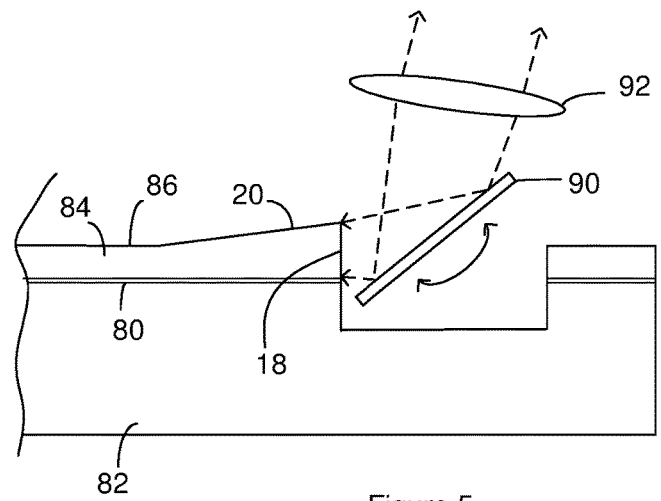
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the chip. For instance, FIG. 5 is a cross section of a portion of the chip taken through the longitudinal axis of the utility waveguide 16. The illustrated chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

Figure 6A:
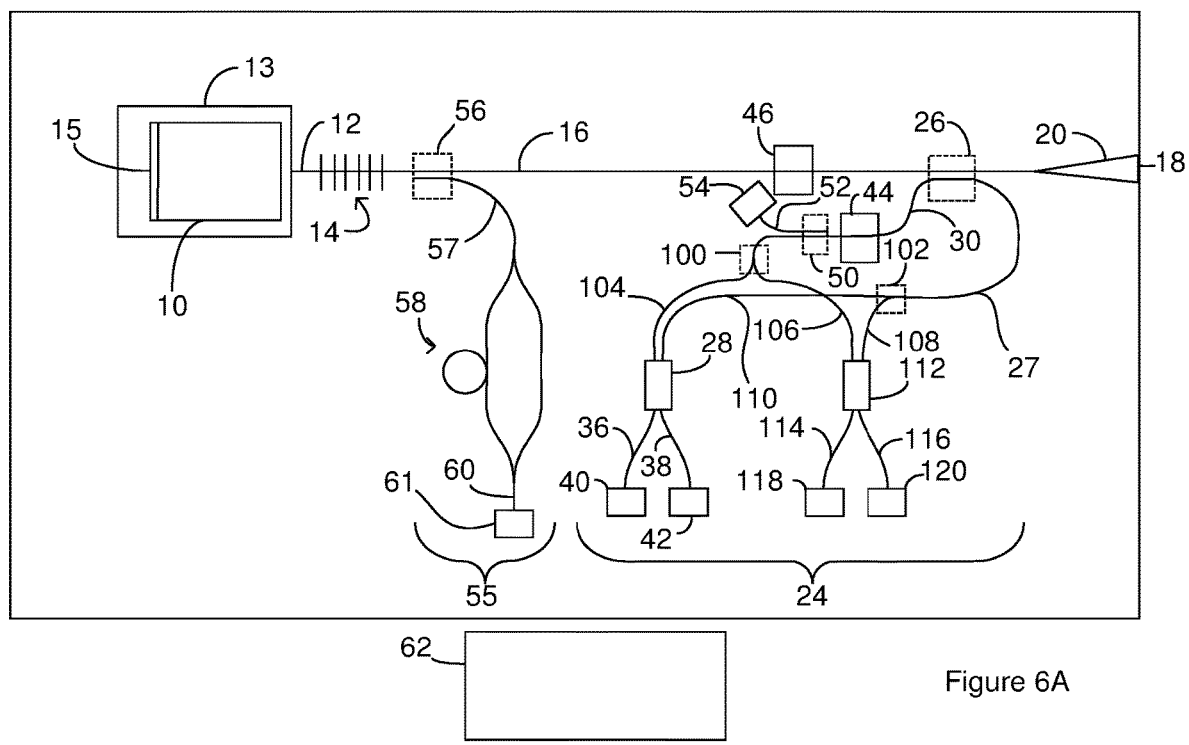
FIG. 6A illustrates the LIDAR chip of FIG. 1 modified to include multiple different balanced detectors for further refining data generated by the LIDAR chip.

The above LIDAR chips can be modified so that data branch includes one or more secondary branches and one or more secondary balanced detectors that can be employed to refine the optical data provided to the electronics. The reference signal and the comparative signal can be divided among the different balanced detectors. For instance, FIG. 6A illustrates the above chip modified to include two different balanced detectors. A first splitter 102 divides the reference signal carried on the reference waveguide 27 onto a first reference waveguide 110 and a second reference waveguide 108. The first reference waveguide 110 carries a first portion of the reference signal to the light-combining component 28. The second reference waveguide 108 carries a second portion of the reference signal to a second light-combining component 112. A suitable first splitter 102 includes, but is not limited to, a y-junction, a Multi-Mode Interference (MMI) device, and a directional coupler.

A second splitter 100 divides the comparative signal carried on the comparative waveguide 30 onto a first comparative waveguide 104 and a second comparative waveguide 106. The first comparative waveguide 104 carries a first portion of the comparative signal to the light-combining component 28. The second comparative waveguide 108 carries a second portion of the comparative signal to the second light-combining component 112. A suitable second splitter 100 includes, but is not limited to, a y-junction, a Multi-Mode Interference (MMI) device, and a directional coupler.

The first light-combining component 28 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The first light-combining component 28 also splits the resulting composite signal onto the first detector waveguide 36 and the second detector waveguide 38.

The second light-combining component 112 combines the second portion of the comparative signal and the second portion of the reference signal into a second composite signal. The light-combining component 112 also splits the resulting composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sinusoidal function. Accordingly, the portion of the reference signal in the first composite signal is phase shifted relative to the portion of the reference signal in the second composite signal, however, the portion of the comparative signal in the first composite signal is not phase shifted relative to the portion of the comparative signal in the second composite signal.

Figure 6B:
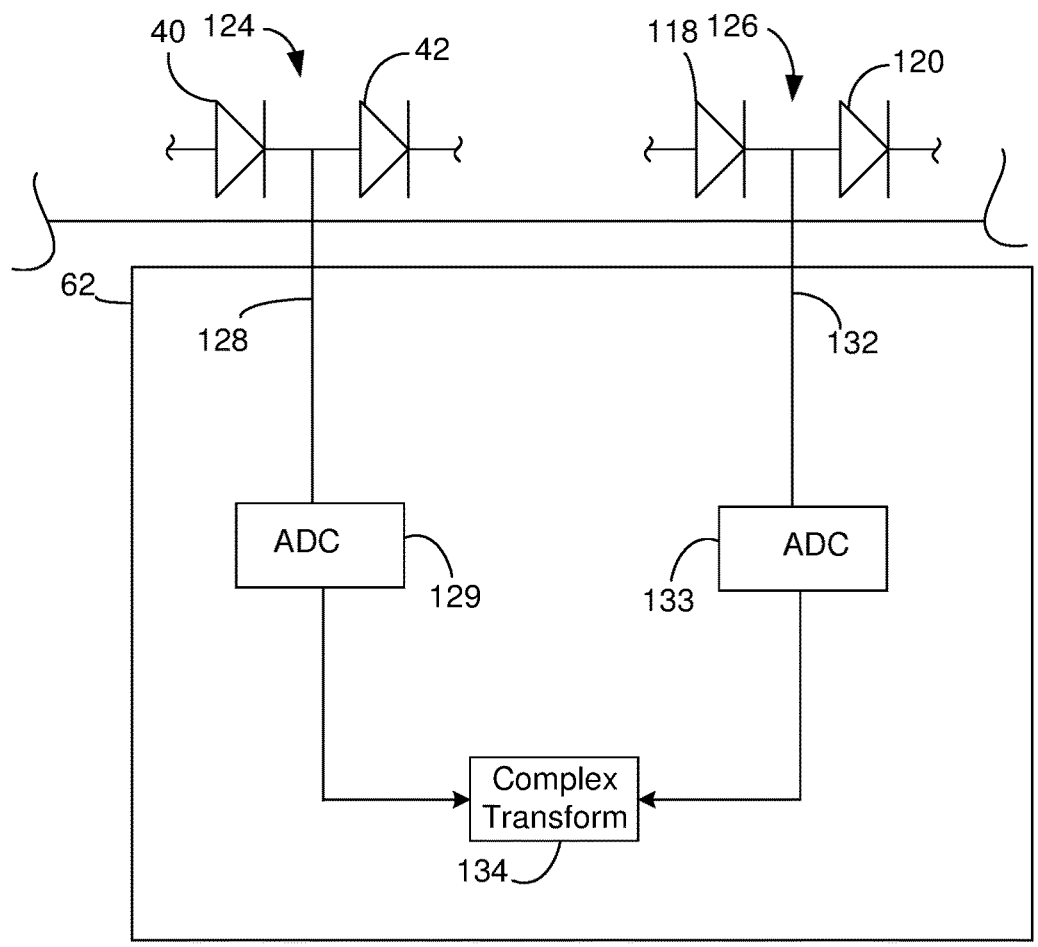
FIG. 6B provides a schematic of electronics that are suitable for use with the LIDAR chip of FIG. 6A.

The first light sensor 40 and the second light sensor 42 can be connected as a balanced detector and the first auxiliary light sensor 118 and the second auxiliary light sensor 120 can also be connected as a balanced detector. For instance, FIG. 6B provides a schematic of the relationship between the electronics, the first light sensor 40, the second light sensor 42, the first auxiliary light sensor 118, and the second auxiliary light sensor 120. The symbol for a photodiode is used to represent the first light sensor 40, the second light sensor 42, the first auxiliary light sensor 118, and the second auxiliary light sensor 120 but one or more of these sensors can have other constructions.

The electronics connect the first light sensor 40 and the second light sensor 42 as a first balanced detector 124 and the first auxiliary light sensor 118 and the second auxiliary light sensor 120 as a second balanced detector 126. In particular, the first light sensor 40 and the second light sensor 42 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal.

The electronics 62 include a first Analog-to-Digital Converter (ADC) 129 that receives the first data signal from the first data line 128. The first Analog-to-Digital Converter (ADC) 129 converts the first data signal from an analog form to a digital form and outputs a first digital data signal. The electronics 62 include a second Analog-to-Digital Converter (ADC) 130 that receives the second data signal from the second data line 132. The second Analog-to-Digital Converter (ADC) 133 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The electronics 62 include a transform component 134 that receives the complex data signal. The transform module is configured to perform a complex transform on a complex signal so as to convert the input from the time domain to the frequency domain. The first digital data signal can be the real component of the complex signal and the second digital data signal can be the imaginary component of the complex. The transform module can execute the attributed functions using firmware, hardware and software or a combination thereof.

Figure 6C:
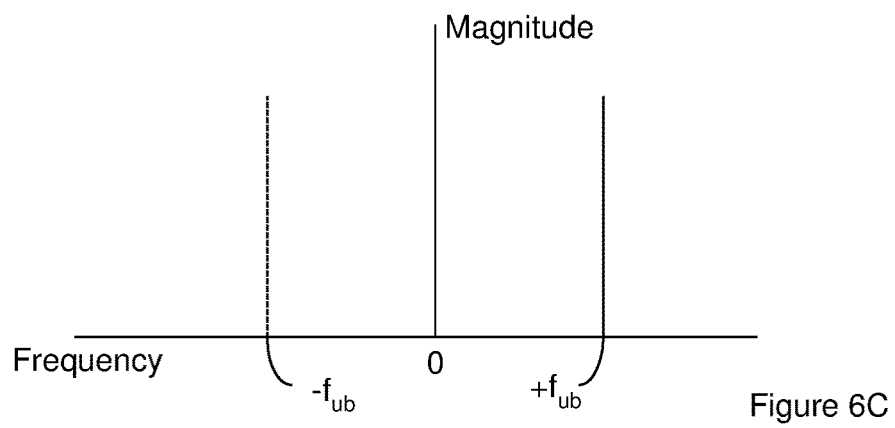
FIG. 6C is a graph of magnitude versus frequency. A solid line on the graph shows results for a Complex Fourier transform performed on output generated from the LIDAR chip of FIG. 6A and FIG. 6B.

The solid line in FIG. 6C provides an example of the output of the transform module when a Complex Fourier transform converts the input from the time domain to the frequency domain. The solid line shows a single frequency peak. The frequency associated with this peak is used by the electronics as the frequency of the LIDAR input signal.

The electronics 62 use this frequency for further processing to determine the distance and/or velocity of the reflecting object. FIG. 6C also includes a second peak illustrated by a dashed line. Prior methods of resolving the frequency of the LIDAR input signal made use of real Fourier transforms rather than the Complex Fourier transform technique disclosed above. These prior methods output both the peak shown by the dashed line and the solid line. As noted above, when using LIDAR applications, it can become difficult to identify the correct peak. Since the above technique for resolving the frequency generates a single solution for the frequency, the inventors have resolved the ambiguity with the frequency solution.

The electronics use the single frequency that would be present in FIG. 6C to determine the distance of the reflecting object from the chip and/or the relative speed of the object and the chip. For instance, the following equation applies during a sample where electronics increase the frequency of the outgoing LIDAR signal: $+f_{ub} = -f_d + \alpha \tau_0$ where $f_{ub}$ is the frequency provided by the transform module, $f_d$ represents the Doppler shift ($f_d = 2vf_c/c$) where $f_c$ is the frequency of the LIDAR output signal, v is the velocity of the reflecting object relative to the chip where the direction from the reflecting object toward the chip is assumed to be the positive direction, and c is the speed of light, $\alpha$ is defined below, and $\tau_0$ is the roundtrip delay for a stationary reflecting object. The following equation applies during a sample where electronics decrease the frequency of the outgoing LIDAR signal: $-f_d = -f_d - \alpha \tau_0$ where $f_{db}$ is the frequency provided by the transform module. In these two equations, v and $\tau_0$ are unknowns. The electronics solve these two equations for the two unknowns.

Figure 7A:
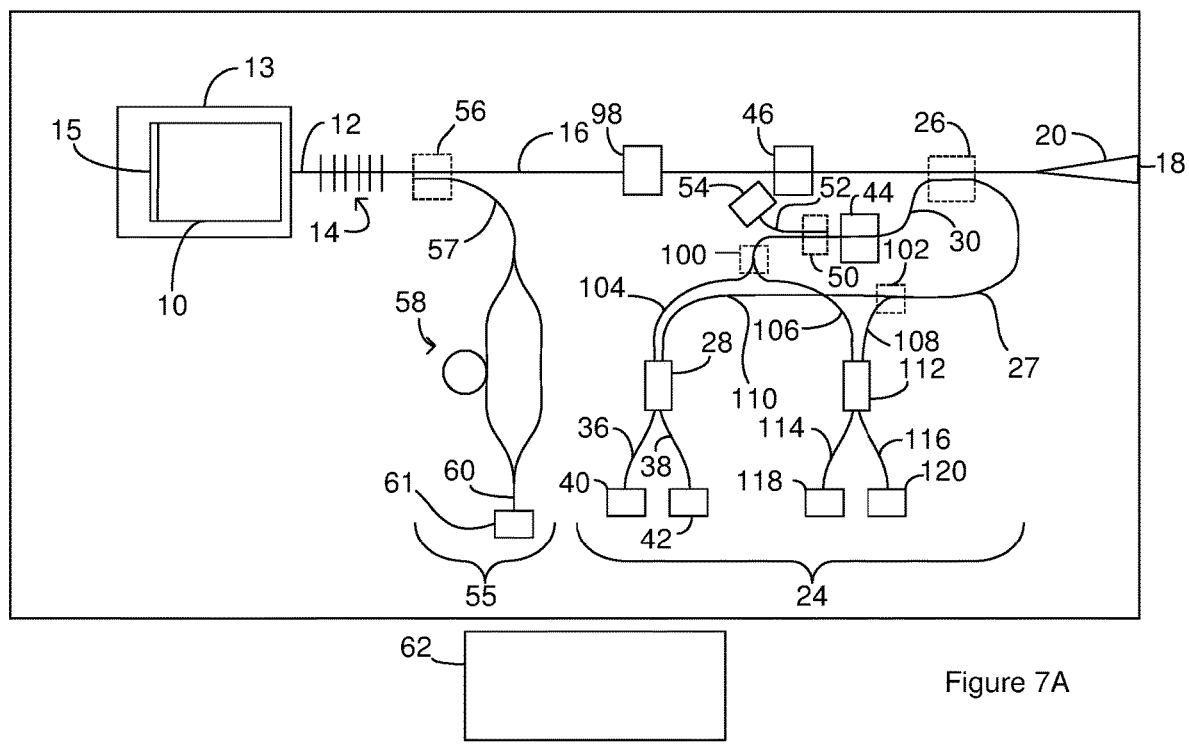
FIG. 7A illustrates the LIDAR chip of FIG. 6A through FIG. 6B modified to include a modulator along the utility waveguide.

The above LIDAR chips can be modified to include components in addition to the components illustrated above. For instance, FIG. 7A illustrates the LIDAR chip of FIG. 6A through FIG. 6B modified to include a modulator 98 along the utility waveguide 16. The modulator 98 is configured to modulate the power of the outgoing LIDAR signal and accordingly the LIDAR output signal. The electronics can operate the modulator. Accordingly, the electronics can modulate the power of the outgoing LIDAR signal and accordingly the LIDAR output signal.

The modulator 98 can be positioned along the utility waveguide 16 before the optical coupler 26. For instance, FIG. 7A shows the modulator positioned along the utility waveguide 16 between the directional coupler 56 and the output optical attenuator 46. Positioning the modulator 98 before the optical coupler 26 causes the reference signal to include the chirp in the amplitude of the reference signal. Suitable modulators include, but are not limited to, PIN diode carrier injection devices, Mach-Zehnder modulator devices, and electro-absorption modulator devices. When the LIDAR chip is constructed on a silicon-on-insulator platform, a suitable modulator is disclosed in U.S. patent application Ser. No. 617,810, filed on Sep. 21, 1993, entitled Integrated Silicon PIN Diode Electro-Optic Waveguide, and incorporated herein in its entirety.

The first splitter 102 divides the reference signal carried on the reference waveguide 27 onto a first reference waveguide 110 and a second reference waveguide 108. The first reference waveguide 110 carries a first portion of the reference signal to the light-combining component 28. The second reference waveguide 108 carries a second portion of the reference signal to a second light-combining component 112.

The second splitter 100 divides the comparative signal carried on the comparative waveguide 30 onto a first comparative waveguide 104 and a second comparative waveguide 106. The first comparative waveguide 104 carries a first portion of the comparative signal to the light-combining component 28. The second comparative waveguide 108 carries a second portion of the comparative signal to the second light-combining component 112.

The first light-combining component 28 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The first light-combining component 28 also splits the resulting composite signal onto the first detector waveguide 36 and the second detector waveguide 38.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

Figure 7B:
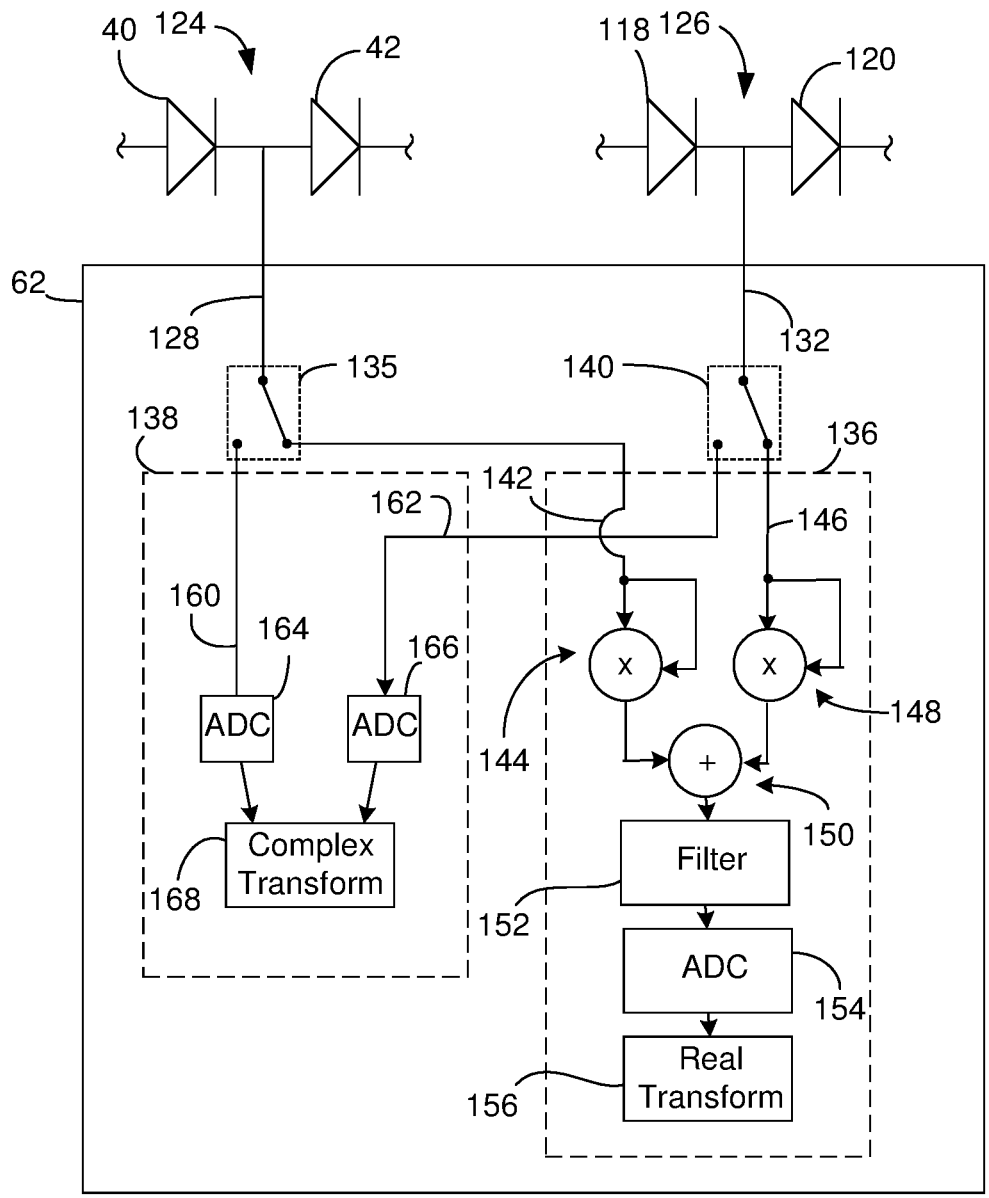
FIG. 7B is a schematic of electronics that are suitable for use with the LIDAR chip of FIG. 7A.

The first light sensor 40 and the second light sensor 42 can be connected as a balanced detector and the first auxiliary light sensor 118 and the second auxiliary light sensor 120 can also be connected as a balanced detector. For instance, FIG. 7B provides a schematic of the relationship between the electronics, the first light sensor 40, the second light sensor 42, the first auxiliary light sensor 118, and the second auxiliary light sensor 120. The symbol for a photodiode is used to represent the first light sensor 40, the second light sensor 42, the first auxiliary light sensor 118, and the second auxiliary light sensor 120 but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The electronics connect the first light sensor 40 and the second light sensor 42 as a first balanced detector 124 and the first auxiliary light sensor 118 and the second auxiliary light sensor 120 as a second balanced detector 126. In particular, the first light sensor 40 and the second light sensor 42 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal, i.e. the beating in the first composite signal and in the second composite signal.

The first data line 128 carries the first data signal to a first switch 135. The first switch can be in a first configuration where the first data signal is carried to a distance branch 136 or in a second configuration where the first data signal is carried to a velocity branch 138. In FIG. 7B, the first switch 135 is shown in the first configuration. The second data line 132 carries the second data signal to a second switch 140. The second switch can be in a first configuration where the second data signal is carried to the distance branch 136 or in a second configuration where the second data signal is carried to a velocity branch 138. In FIG. 7B, the second switch 140 is shown in the first configuration. A suitable switch for use as the first switch and/or second switch includes, but is not limited to, an electromechanical switch, and a solid state MOSFET or PIN diode switch.

The electronics operate the first switch and the second switch such that they are in the same configuration during the first period and during the second period. For instance, the electronics can operate the first switch and the second switch such that the first switch and the second switch are both in the first configuration during the first period and both in the second configuration during the second period. In this example, the first data signal and the second data signal are carried to the distance branch 136 during the first period and to the velocity branch 138 during the second period.

The distance branch can be configured to use the first data signal and the second data signal to determine or approximate at least the distance between the LIDAR chip and the reflecting object. For instance, during the first period, the electronics can operate the modulator 98 so as to add chirp to the amplitude of the outgoing LIDAR signal and accordingly the LIDAR output signal. Adding chirp to the amplitude can include modulating the amplitude of the outgoing LIDAR signal such that the amplitude of the outgoing LIDAR signal is a function of a sinusoid. In one example, the amplitude of the outgoing LIDAR signal is modulated such that the amplitude of the outgoing LIDAR signal is a square root of a function that includes a sinusoid and/or is a square root of a sinusoid. For instance, the outgoing LIDAR signal can be modulated so as to produce a modulated outgoing LIDAR signal and LIDAR output signal mathematically represented by Equation 1: $(M+N*\cos(C*t+D*t^2))^{1/2} \cos(F*t)$ where M, N, C, D and F are constants, t represents time, $M>0$, $N>0$, and $M \geq N$ in order to prevent the radicand from becoming negative, C>0, D≠0. As will become evident below, F can be a function of the frequency of the LIDAR output signal ($f_c$). In Equation 1, F and C can be selected such that F>>C.

The distance branch includes a first distance branch line 142. During the first period, the first distance branch line 142 carries the first data signal to a first multiplier 144. In FIG. 7B, the first multiplier 144 is configured to square the amplitude of the first data signal and to output a first multiplied data signal. The distance branch includes a second distance branch line 146. During the first period, the second distance branch line 146 carries the second data signal to a second multiplier 148. In FIG. 6B, the second multiplier 148 is configured to square the amplitude of the second data signal and to output a second multiplied data signal. Suitable first multipliers and/or second multipliers include, but are not limited to, RF mixers such as a Gilbert cell mixer.

The distance branch includes an adder 150 that sums the first multiplied data signal and the second multiplied data signal. The adder outputs a summed data signal. Suitable adders include, but are not limited to, RF combiners including resistive or hybrid combiners. The distance branch includes a low-pass filter 152 that receives the summed data signal and outputs a beating data signal. The low-pass filter is selected to remove higher frequency contributions to the summed data signal that are artifacts of the mixing of the reference and return signals. The low-pass filter can be selected to have a bandwidth greater than or equal to: $f_{dmax}/2+\alpha\tau_{0max}$ where $f_{dmax}$ represents the maximum level of the Doppler shift of the LIDAR input signal relative to the LIDAR input signal for which the LIDAR system is to provide reliable results, $\tau_{0max}$ represents maximum delay between transmission of the LIDAR output signal and the receipt of the LIDAR input signal, and c represents the rate of change in the frequency of the chirp added to the amplitude of the modulated outgoing LIDAR signal during the duration of the sample period (i.e. the first period). In some instances, α is determined from B/T where B represents the change in the frequency of the chirp added to the amplitude of the modulated outgoing LIDAR signal during the duration of the sample period and T is the duration of the sample period. In some instances, T is determined from:

$$T = \frac{\lambda_c}{2\Delta v_{min}} + \tau_{0max}$$

where $\lambda_c$ represents the wavelength of the outgoing LIDAR signal, represents velocity resolution and B can be determined from $$B = \frac{cT}{2(T - \tau_{0max})\Delta R_{min}}$$

where c represents the speed of light and $\Delta R_{min}$ represents distance resolution. In some instances, the filter has a bandwidth greater than 0.1 GHz, 0.2 GHz, or 0.3 GHz and/or less than 0.4 GHz, 0.5 GHz, or 1 GHz. Corresponding values for the sweep period (T) can be 10 µs, 8 µs, 4 µs, 3 µs, 2 µs, and 1 µs.

The distance branch includes an Analog-to-Digital Converter (ADC) 154 that receives the beating data signal from the filter. The Analog-to-Digital Converter (ADC) 154 converts the beating data signal from an analog form to digital form and outputs the result as a digital LIDAR data signal. As discussed above, the conversion of the beating data signal includes sampling the beating data signal at a sampling rate. The addition of the chirp to the amplitude of the LIDAR output signal substantially reduces or removes the effects of radial velocity from the beating of the composite signal and the resulting electrical signals. For instance, the frequency shift of the LIDAR output signal relative to the LIDAR input signal ("frequency shift," Δf) can be written as $\Delta f=\Delta f_d+\Delta f_s$ where $\Delta f_d$ represents the change in frequency due to the Doppler shift and $\Delta f_s$ is the change in frequency due to the separation between the reflecting object and the LIDAR chip. The outgoing LIDAR signal can be modulated so as to produce a modulated outgoing LIDAR signal and accordingly, a LIDAR output signal that is also modulated, where the change in frequency due to the Doppler shift ($\Delta f_d$) is less than 10%, 5%, 1%, or even 0.1% of the Doppler shift that would occur from a sinusoidal LIDAR output signal serving as the LIDAR and having a constant amplitude and the same frequency as the modulated outgoing LIDAR signal and/or the LIDAR output signal. For instance, the outgoing LIDAR signal and/or the LIDAR output signal can be modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from a continuous wave serving as the LIDAR output signal and having the same frequency as the modulated outgoing LIDAR signal and/or the LIDAR output signal. In another example, the outgoing LIDAR signal and/or the LIDAR output signal are modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from the outgoing LIDAR signal before modulation (the unmodulated outgoing LIDAR signal) serving as the LIDAR output signal. These results can be achieved by increasing the value of the Equation 1 variable F relative to C. For instance, F can represent $2\pi f_c$ and C can represent $2\pi f_1$ where $f_1$ denotes the base frequency of the frequency-chirp in the amplitude of the modulated outgoing LIDAR signal. Accordingly, F can be increased relative to C by increasing the value of the frequency of the LIDAR output signal ($f_c$) relative to the chirp base frequency ($f_1$). As an example, $f_c$ and $f_1$ can be selected such that $f_c>>f_1$. In some instances, $f_c$ and $f_1$ are selected such that a ratio of $f_c:f_1$ is greater than 2:1, 10:1, $1\times10^4$:1, $5\times10^4$, or $1\times10^5$:1 and/or less than $5\times10^5$, $1\times10^6$, $5\times10^6$ or $5\times10^8$. Accordingly, the variables F and C can also have these same values for a ratio of F:C. The reduction and/or removal of the change in frequency due to the Doppler shift ($\Delta f_d$) from the frequency shift lowers the beat frequency and accordingly reduces the required sampling rate.

The distance branch includes a transform module 156 that receives the digital LIDAR data signal from the Analog-to-Digital Converter (ADC) 154. The transform module 156 is configured to perform a real transform on the digital LIDAR data signal so as to convert from the time domain to the frequency domain. This conversion provides an unambiguous solution for the shift in frequency of the shift of the LIDAR input signal relative to the LIDAR input signal that is caused by the distance between the reflecting object and the LIDAR chip. A suitable real transform is a Fourier transform such as a Fast Fourier Transform (FFT). The classification of the transform as a real transform distinguishes the transform from complex transforms such as complex Fourier transforms. The transform module can execute the attributed functions using firmware, hardware or software or a combination thereof.

Since the frequency provided by the transform module does not have input from, or does not have substantial input from, a frequency shift due to relative movement, the determined frequency shift can be used to approximate the distance between the reflecting object and the LIDAR chip. For instance, the electronics can approximate the distance between the reflecting object and the LIDAR chip ($R_0$) using Equation 3: $R_0=c*\Delta f/(2\alpha)$ where $\Delta f$ can be approximated as the peak frequency output from the transform module, and c is the speed of light.

The velocity branch can be configured to use the first data signal and the second data signal to determine or approximate at least the radial velocity of the LIDAR chip and the reflecting object. The LIDAR output signal with a frequency that is a function of time disclosed in the context of FIG. 1 can be replaced by a LIDAR output signal where the frequency of the LIDAR output signal is not a function of time. For instance, the LIDAR output signal can be a continuous wave (CW). For instance, during the second period, the modulated outgoing LIDAR signal, and accordingly the LIDAR output signal, can be an unchirped continuous wave (CW). As an example the modulated outgoing LIDAR signal, and accordingly the LIDAR output signal, can be represented by Equation 2: $G*\cos(H*t)$ where G and H are constants and t represents time. In some instances, G represents the square root of the power of the outgoing LIDAR signal and/or H represents the constant F from Equation 1. In instances where the output of the laser cavity has the waveform that is desired for the modulated outgoing LIDAR signal, the electronics need not operate the modulator 98 so as to modify the outgoing LIDAR signal. In these instances, the output of the laser cavity can serve as the modulated outgoing LIDAR signal and accordingly the LIDAR output signal. In some instances, the electronics operate the modulator 98 so as to generate a modulated outgoing LIDAR signal with the desired form.

Since the frequency of the LIDAR output signal is constant in the second period, changing the distance between reflecting object and LIDAR chip does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the LIDAR output signal.

The velocity branch includes a first velocity branch line 160 and a second velocity branch line 162. During the second period, the first velocity branch line 160 carries the first data signal to an Analog-to-Digital Converter (ADC) 164 which converts the first data signal from an analog form to a digital form and outputs a first digital data signal. As discussed above, the conversion of the first data signal is done by sampling the first data signal at a sampling rate. The use of a continuous wave as the LIDAR output signal substantially removes the effects of distance between the reflecting object and LIDAR system from the beating of the composite signal and the resulting electrical signals. Accordingly, the beating frequency is reduced and the required sampling rate is reduced.

The second velocity branch line 162 carries the second data signal to an Analog-to-Digital Converter (ADC) 166 which converts the second data signal from an analog form to a digital form and outputs a second digital data signal. As discussed above, the conversion of the second data signal includes sampling the second data signal at a sampling rate. The use of a continuous wave as the LIDAR output signal substantially reduces or removes the effects of distance between the reflecting object and LIDAR system from the beating of the second composite signal and the resulting electrical signals. Accordingly, the beating frequency is reduced and the required sampling rate is reduced.

The sampling rate for the Analog-to-Digital Converter (ADC) 164 can be the same or different from the sampling rate for the Analog-to-Digital Converter (ADC) 166.

The velocity branch includes a transform module 168 that receives the first digital data signal from the Analog-to-Digital Converters (ADC) 164 and the second digital data signal from the Analog-to-Digital Converters (ADC) 166. Since the first data signal is an in-phase component and the second data signal its quadrature component, the first data signal and the second data signal together act as a complex velocity data signal where the first data signal is the real component and the second data signal is the imaginary component. As a result, the first digital data signal can be the real component of a digital velocity data signal and the second data signal can be the imaginary component of the digital velocity data signal. The transform module 168 can be configured to perform a complex transform on the digital velocity data signal so as to convert from the time domain to the frequency domain. This conversion provides an unambiguous solution for the shift in frequency of LIDAR input signal relative to the LIDAR input signal that is caused by the radial velocity between the reflecting object and the LIDAR chip. A suitable complex transform is a Fourier transform such as a complex Fast Fourier Transform (FFT). The transform module can execute the attributed functions using firmware, hardware or software or a combination thereof.

Since the frequency shift provided by the transform module 168 does not have input from a frequency shift due to the separation distance between the reflecting object and the LIDAR chip, and because of the complex nature of the velocity data signal, the output of the transform module 168 can be used to approximate the radial velocity between the reflecting object and the LIDAR chip. For instance, the electronics can approximate the radial velocity between the reflecting object and the LIDAR chip (v) using Equation 4: $v=c*f_d/(2*f_c)$ where $f_d$ is approximated as the peak frequency output from the transform module 168, c is the speed of light, and $f_c$ represents the frequency of the LIDAR output signal.

Additional components can be added to the schematic of FIG. 7B. For instance, when the LIDAR system generates multiple LIDAR output signals or is used with other LIDAR systems that generate LIDAR output signals (i.e., by means of frequency or wavelength division multiplexing, FDM/WMD), the LIDAR system can include one or more filters to remove interfering signals from the real and/or imaginary components of the beating data signal and/or of the velocity data signal. Accordingly, the LIDAR system can include one or more filters in addition to the illustrated components. Suitable filters include, but are not limited to, lowpass filters. In the case of the optical design, if the frequency of the interfering components fall outside the bandwidth of the balance detector(s), additional filtering may not be necessary as it may be effectively provided by the balance detector(s).

Figure 8A:
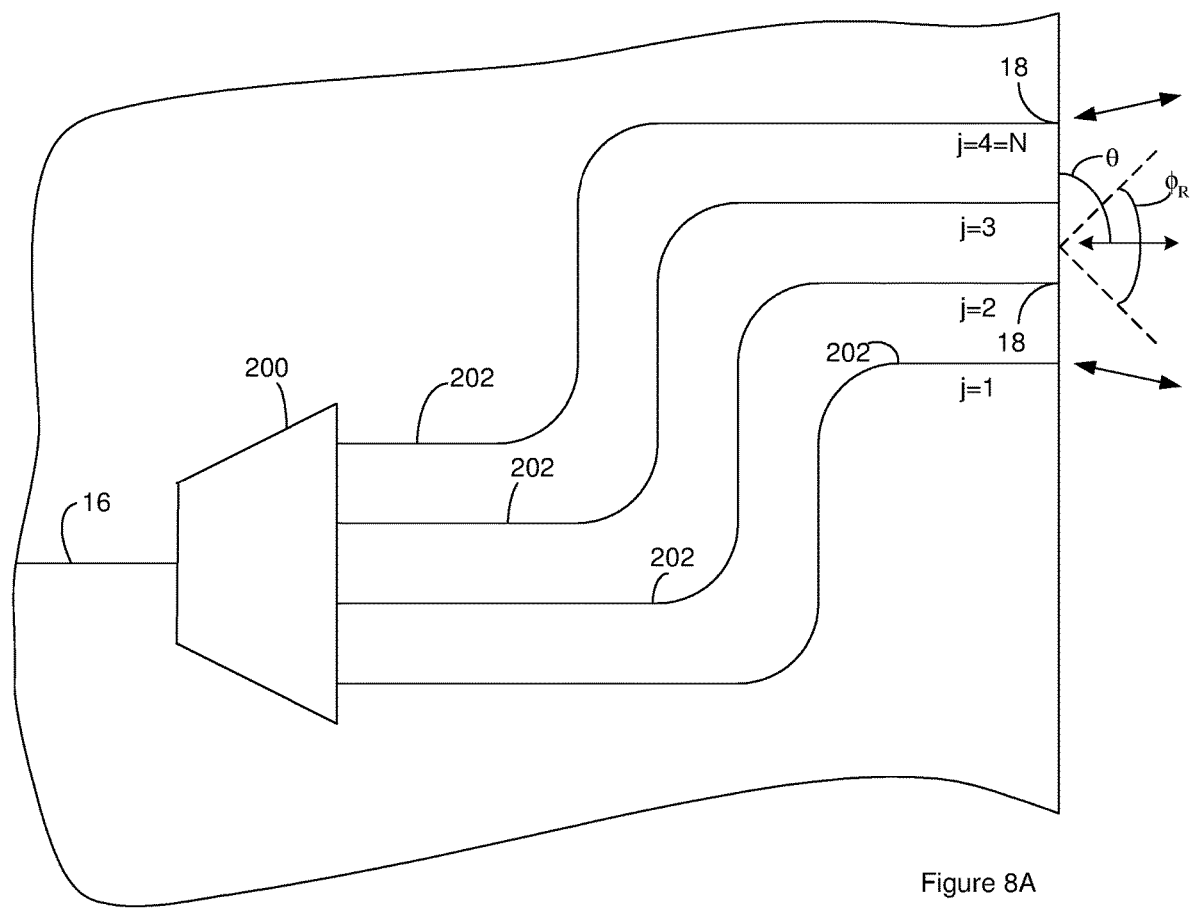
FIG. 8A illustrates a portion of the chip modified so as to use a phase differential between output signals to steer a LIDAR output signal.
Figure 8B:
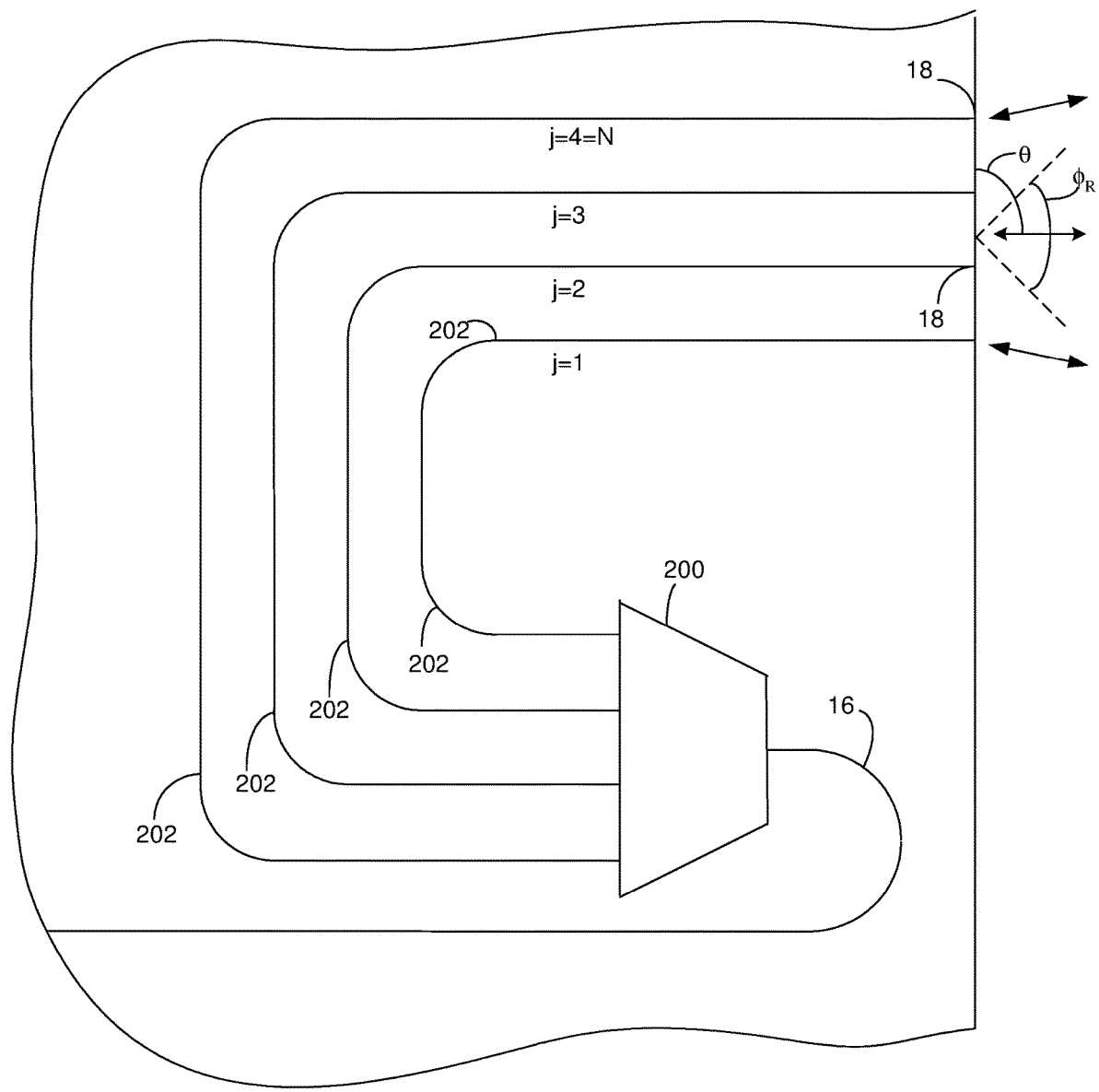
FIG. 8B illustrates a portion of another embodiment of the chip modified so as to use a phase differential between output signals to steer a LIDAR output signal.

The sampling rate that is used during the first period and the second period can be selected to have a value that is greater than or equal to the larger of two values selected from the group consisting of the minimum sampling rate for the first period and the minimum sampling rate for the second period. For instance, during the first period the range of rates for the first period sampling rate ($f_{s1}$) can be determined by $f_{s1} \geq 2 \times \alpha \tau_{0max}$ where $\tau_{0max}$ represents the maximum amount of time between the transmission of the LIDAR output signal and the receipt of the LIDAR input signal. During the second period the range of rates for the second period sampling rate ($f_{s2}$) can be determined by $f_{s2} \geq 2 \times f_{dmax}$ where $f_{dmax}$ represents the maximum level of the Doppler shift of the LIDAR input signal relative to the LIDAR input signal for which the LIDAR system is to provide reliable results. The maximum is determined by the largest level for which the LIDAR system is to provide reliable results. Accordingly, the maximum distance generally corresponds to the distance for the field of view set in the LIDAR specifications and the maximum Doppler shift generally corresponds to the Doppler shift that would occur at the maximum radial velocity values set in the specifications. These two equations show that the minimum sampling rate for the first period is $2\alpha\tau_{0max}$ and the minimum sampling rate for the second period is $2f_{dmax}$. As a result, the sampling rate is selected to have a value that is greater than or equal to the larger of $2\alpha\tau_{0max}$ and $2f_{dmax}$. In other words, the sample rate used during the first period and the second period ($f_s$) is $f_s \geq \max(2\alpha\tau_{0max}, 2f_{dmax})$. In some instances, the sample rate used during the first period and the second period ($f_s$) is greater than or equal to 0.1 GHz, 0.2 GHz, or 0.5 GHz and/or less than 1 GHz, 2 GHz, or 4 GHZ The above LIDAR chips can be modified to include beam-steering mechanism(s) for tuning a direction that the LIDAR output signal travels away from the LIDAR chip. For instance, FIG. 8A and FIG. 8B illustrate a portion of a chip configured to use the phase differential between output signals to steer the LIDAR output signals. The portion(s) of the chip that are not illustrated in FIG. 8A and FIG. 8B can be constructed as described above. For instance, the utility waveguide 16 shown in FIG. 8A and FIG. 8B can be the utility waveguide 16 of a chip constructed as shown in FIG. 1, FIG. 6A, and FIG. 7A.

The utility waveguide 16 in FIG. 8A and FIG. 8B carries the outgoing LIDAR signal to a splitter 200 that divides the outgoing LIDAR signal into multiple output signals that are each carried on a steering waveguide 202. Each of the steering waveguides 202 ends at a facet 18. The facets 18 are arranged such that the output signals exiting the chip through the facets 18 combine to form the LIDAR output signal. During operation of the chip, at least a portion of the LIDAR output signal is reflected by an object located off the chip. At least a portion of the reflected signal returns to the facets 18 of the steering waveguides 202 and enters the steering waveguides 202 as a portion of a LIDAR input signal. The steering waveguides 202 carry the portions of the LIDAR input signal to the splitter 200 where they are combined into the LIDAR input signal carried on the utility waveguide 16.

The splitter 200 and steering waveguides 202 can be constructed such that there is a phase differential between output signals at the facet 18 of adjacent steering waveguides 202. For instance, the splitter 200 and steering waveguides 202 can be constructed such that there is a linearly increasing phase differential between output signals at the facet 18 of adjacent steering waveguides 202. For instance, the steering waveguides 202 can be constructed such that the phase of steering waveguide number j is $f_o + (j-1)f$ where j is an integer from 1 to N and represents the number associated with a steering waveguide when the steering waveguides are sequentially numbered as shown in FIG. 8A and FIG. 8B, f is the phase differential between neighboring steering waveguides, and $f_o$ is the phase of the output signal at the facet 18 of steering waveguide j=1. In some instances, the phase differential is achieved by constructing the steering waveguides such that the steering waveguides have a linearly increasing length differential. For instance, the length of steering waveguide j can be represented by $L_o + (j-1)\Delta L$ where j is an integer from 1 to N and represents the number associated with a steering waveguide when the steering waveguides are sequentially numbered as shown in FIG. 8A and FIG. 8B, $\Delta L$ is the length differential between neighboring steering waveguides, and $L_o$ is the length of steering waveguide j=1. Suitable $\Delta L$ include, but are not limited to, $\Delta L$ greater than 0, or 5 and/or less than 25, or 50 μm. Suitable f include, but are not limited to, f greater than 07, or 7π and/or less than 15π, or 20π. Suitable N include, but are not limited to, N greater than 10, or 500 and/or less than 1000, or 2000. Suitable splitters include, but are not limited to, star couplers, cascaded Y-junctions and cascaded 1×2 MMI couplers. The steering waveguides 202 configuration of FIG. 8B may be preferred as the length differential between neighboring steering waveguides ($\Delta L$) increases.

As is evident in FIGS. 8A and 8B, the steering waveguides 202 can each exclude a phase tuner. In some instances, more than 10% of the N steering waveguides or more than 50% of the N steering waveguides each excludes a phase tuner.

Figure 9:
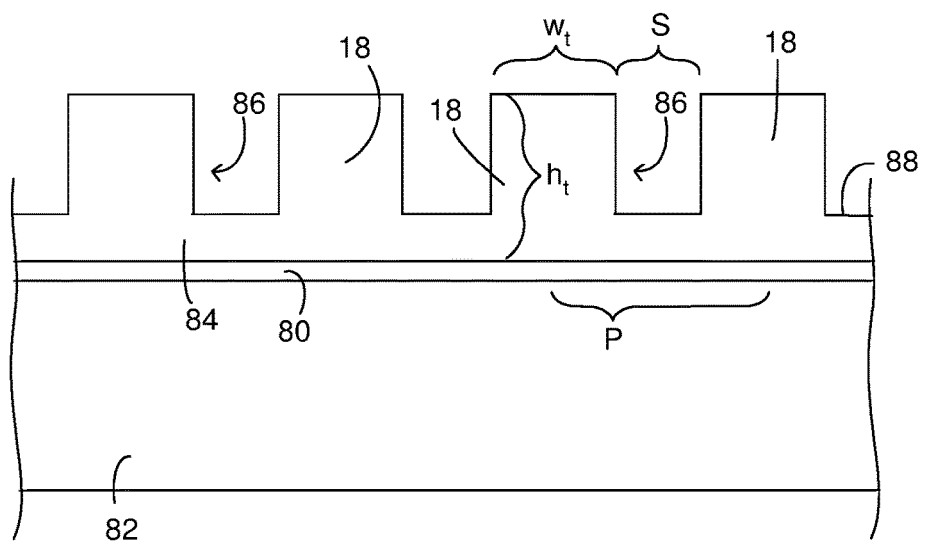
FIG. 9 is a sideview of the chip of FIG. 6 looking towards the facets from off of the chip.

FIG. 9 is a sideview of the chip looking towards the facets from off of the chip. The steering waveguides are constructed according to FIG. 2. The pitch is the distance between the facets and is labeled P in FIG. 9. The pitch can be measured center-to-center or from lateral side one facet 18 to the corresponding lateral side of the adjacent facet 18. Reducing the pitch increases the range of angles over which the LIDAR output signal can be scanned effectively. However, as the facets approach each other, evanescent coupling can occur. Evanescent coupling is prevented or reduced when the separation between the adjacent lateral sides of the facets 18 (labeled S in FIG. 9) is greater than 1 μm.

Accurate forming and steering of the beam depends on maintaining a constant phase relationship between the various elements of the steering waveguide array. This is difficult with smaller silicon waveguides as their small dimensions mean that there is a large percentage variation of waveguide width due to fabrication limitations and hence a large variation of effective index, and some form of phase correction needs to be employed to ensure correct operation. These issues can be overcome by constructing the steering waveguides with the larger waveguide dimensions disclosed above.

Figure 10:
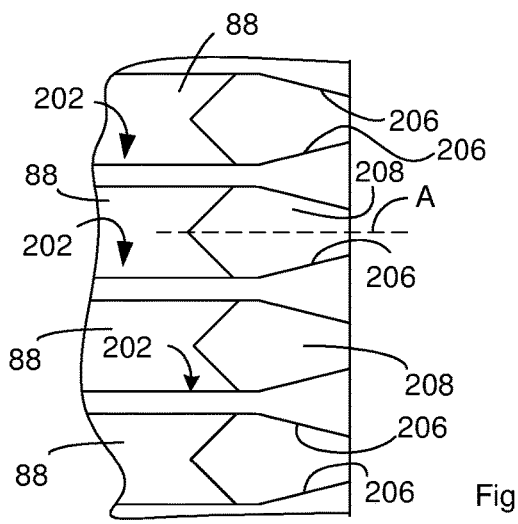
FIG. 10 is a topview of a chip having multiple steering waveguides that each includes a taper that terminates at a facet.

One or more of the steering waveguides can include tapers. For instance, FIG. 10 is a topview of a chip where at least a portion of the steering waveguides each includes a taper 206 that terminates at one of the facets 18. Although the tapers are shown terminating at the facets 18, the tapers can terminate before the facet 18. Accordingly, there can be an untapered portion of a steering waveguide between a taper and a facet 18. Although the tapers 206 in FIG. 10 are shown as expanding the width of the steering waveguides at they approach the facets, the tapers 206 can be constructed so as to contract the width of the steering waveguides at they approach the facets. Reducing the width of the steering waveguides at the facet can help bring the facets of different steering waveguides closer together. As a result, width reducing tapers can preserve low pitch levels and while also permitting a separation level that prevents or reduce coupling between adjacent steering waveguides.

The tapers illustrated in FIG. 10 are horizontal tapers, however, the tapers can also be vertical. The width of the facet is labeled $w_t$ in FIG. 9 and the height of the facet is labeled $h_t$ in FIG. 9. The tapers can be constructed such that the width of the facet ($w_t$) is less than 30, 20, or 10 µm and/or greater than 5, 2, or 1 µm. Accordingly, an untapered portion of a steering waveguide located between the taper and the splitter 200 can have a width greater than 1 m and less than 4 µm and a height greater than 1 µm and less than 4 µm and an untapered portion of a steering waveguide located between the taper and the facet and/or the facet itself can have a width greater than 1 µm and less than 4 µm and a height greater than 1 µm and less than 4 m. Additionally or alternately, the tapers can be constructed such that the separation between adjacent facets is greater than 0.2, 0.3, or 0.4 µm and/or less than 0.6, 0.8, or 1 µm while the pitch is greater than 1.5, 3, or 6 µm and/or less than 10, 20, or 30 µm. With these dimensions and at 1550 nm wavelength, a scanning angle range ($\phi_R$) greater than 60°, 30°, or 20° and/or less than 5°, 3°, or 1° can be achieved.

Figure 11A:
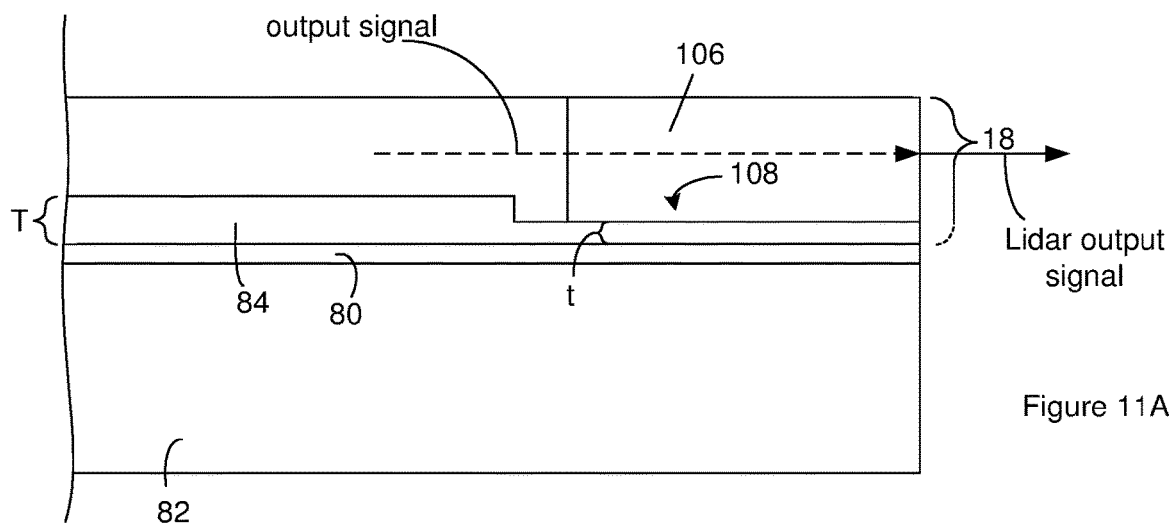
FIG. 11A is a sideview of a cross section of a portion of the chip shown in FIG. 10. The cross section is taken along the line labeled A in FIG. 10.
Figure 11B:
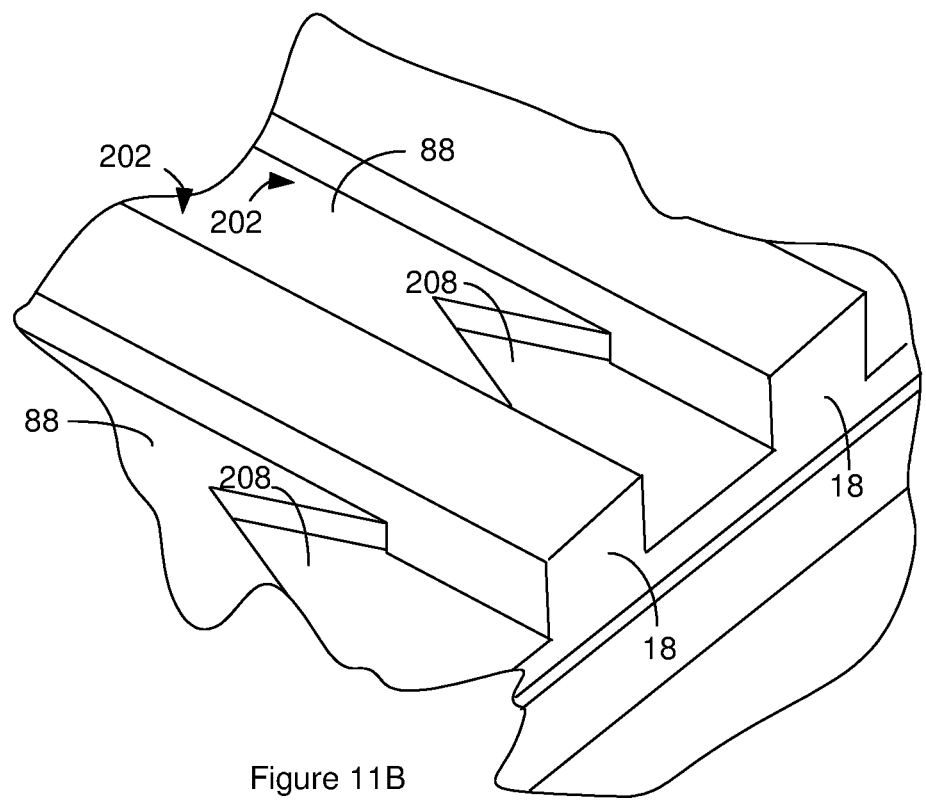
FIG. 11B is a perspective view of a portion of the chip shown in FIG. 10.

Optical coupling between steering waveguides in the region of the facets 18 can be reduced by reducing the thickness of the slab regions in the region of the facets 18. FIG. 11A is a sideview of a cross section of a portion of the chip shown in FIG. 10. The cross section is taken along the line labeled A in FIG. 10. Since FIG. 11A is a sideview, chip features that are in the background of the cross section are also illustrated. For instance, the cross section is taken through a slab region 88; however, a ridge of a steering waveguides 202 is visible behind the slab region 88. FIG. 11B is a perspective view of a portion of the chip shown in FIG. 10. The image shown in FIG. 11B does not include the tapers 206 that are shown in FIG. 10 although the slab region configuration shown in FIG. 11B can be used in conjunction with the tapers 206.

The steering waveguides 202 each extends from a slab region 88. The thickness of the slab regions 88 decreases as the slab region 88 approaches the facets and/or the lateral side of the chip. For instance, the slab regions include a recess 208 that extends at least partway into the slab region 88. When the recess 208 extends part way through the slab region 88 as shown in FIG. 11A, the light-transmitting medium 84 at the bottom of the recess 208 can be continuous with the light-transmitting medium 84 in the slab region and accordingly serves as a reduced portion of the slab region 88. The thickness of slab region is labeled T in FIG. 11A and the thickness of reduced slab region is labeled t. A suitable thickness for the reduced slab regions at one or more locations selected from between the facets, adjacent to a facet and at a lateral side of the chip, between the tapers includes, but is not limited to, a thickness greater than 0.0 µm and less than 0.2 µm or 0.5 µm. The chip can be constructed such that a ratio of the slab region thickness (T): reduced slab region thickness (t) is greater than 1.2:1, 2:1 or 4:1 and/or less than 10:1, or 5:1.

Figure 11C:
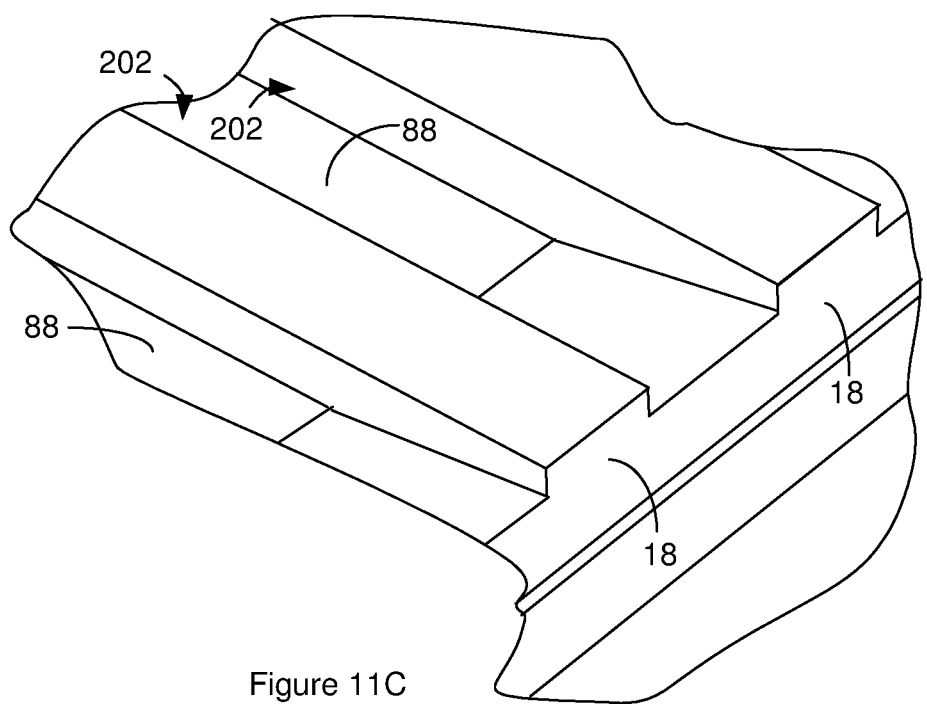
FIG. 11C is a perspective view of a portion of a chip having a tapered slab region.

The slab regions can taper vertically and/or horizontally near the facets. For instance, FIG. 11C is a perspective view of a portion of the chip shown in FIG. 10. The portion of the slab region adjacent to the facets tapers vertically such that the thickness of the slab regions increases as the slab regions approach the facet. The tapers 206 are not shown in FIG. 11C in order to simplify the drawing. However, the vertical and/or horizontal tapers of the slab regions can be used in conjunction with tapers 206 such as are shown in FIG. 10 or tapers 206 that become narrower as the steering waveguides 202 approach the facets 18. Accordingly, vertical taper(s) of the slab regions such as is shown in FIG. 11C can be positioned between tapered 106 regions of the steering waveguides. Such an arrangement can reduce optical loss.

Figure 12:
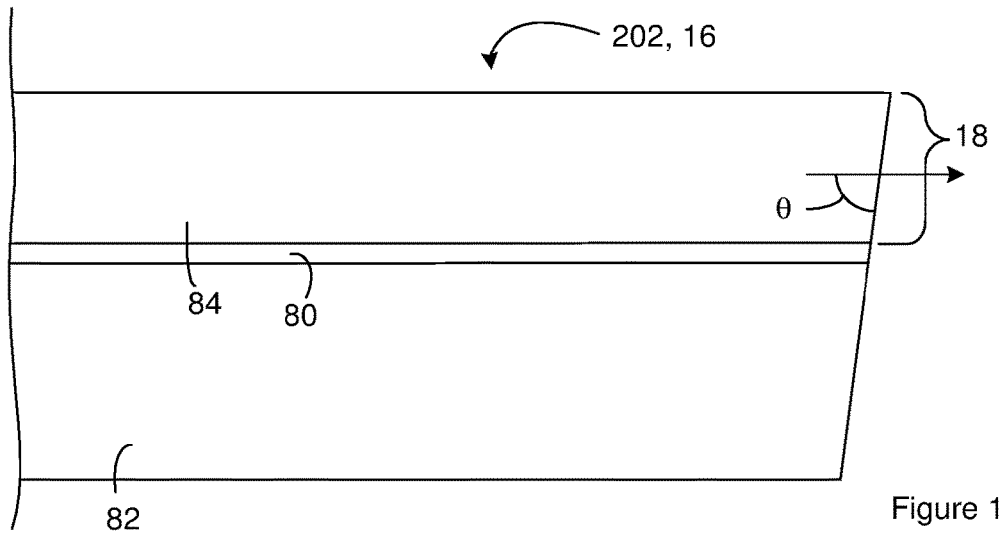
FIG. 12 is a cross section of a waveguide having a non-perpendicular angle between a facet and the direction of propagation of light signals through the waveguide at the facet.

The steering waveguides can be constructed such that the direction of propagation the output signals in the steering waveguides at the facets is substantially parallel to the plane of the device, an upper surface of the substrate and/or a lower surface of the substrate. In some instances, the above facets 18 are perpendicular or substantially perpendicular relative to the base and/or an upper surface of the substrate and/or a lower surface of the substrate. Additionally or alternately, the facets 18 can also be constructed such that the smallest angle between the plane of facet and the direction of propagation of the output signals at the facet is between 80° and 90°. For instance, FIG. 12 is a cross section of a waveguide such as a utility waveguide 16 or a steering waveguide 202 wherein the angle $\theta$ represents the smallest angle between the facet and the direction of propagation of the output signals. Suitable values for the angle include, but are not limited to, angles greater than 10°, 9°, or 8° and/or less than 7°, 6°, or 5°.

As noted above, the steering waveguides 202 are designed such that the length of the steering waveguides 202 increases linearly. The length differential causes diffraction such that light of different wavelengths travels away from chip in different directions ($\theta$). As a result, the electronics can tune the wavelength (or frequency) of a LIDAR output signal in order to tune a direction that the LIDAR output signal travels away from the LIDAR chip. The range of the angles that can be reached with this tuning mechanism is labeled $\phi_R$ in FIG. 8A and FIG. 8B. The rate of change in the angle ($\theta$) per change in frequency of the LIDAR output signal (f) can be written as $d\theta/df$ and is a function of the pitch (labeled P in FIG. 9) and the length differential between neighboring steering waveguides ($\Delta L$). For instance, the angular rate of change ($d\theta/df$) increases as the length differential between neighboring steering waveguides ($\Delta L$) increases and the angular rate of change ($d\theta/df$) increases as the pitch decreases. In some instances, the steering waveguides are constructed with a $\Delta L$ greater than 50, or 100 µm and/or less than 200, or 300 µm and a pitch, P, greater than 1.5, 3, or 6 µm and/or less than 10, 20, or 30 µm. Suitable N include, but are not limited to, N greater than 100, or 1000 and/or less than 2000, or 3000. In some instances, the splitter 200 and steering waveguides 202 or the steering waveguides 202 are constructed so as to provide an angular rate of change ($d\theta/df$) of greater than 0.001°/GHz, 0.05°/GHz, or 0.1°/GHz and/or less than 0.2°/GHz, 0.3°/GHz, or 0.4°/GHz can be achieved.

During operation of a LIDAR system that includes the LIDAR chip, the LIDAR output signal is directed from one sample region of a field of view to another sample region in the field of view. The electronics can tune the frequency of the LIDAR output signal in order to tune the direction that the LIDAR output signal travels away from the LIDAR chip and accordingly to direct the LIDAR output signal from one sample region to another sample region.

Figure 13A:
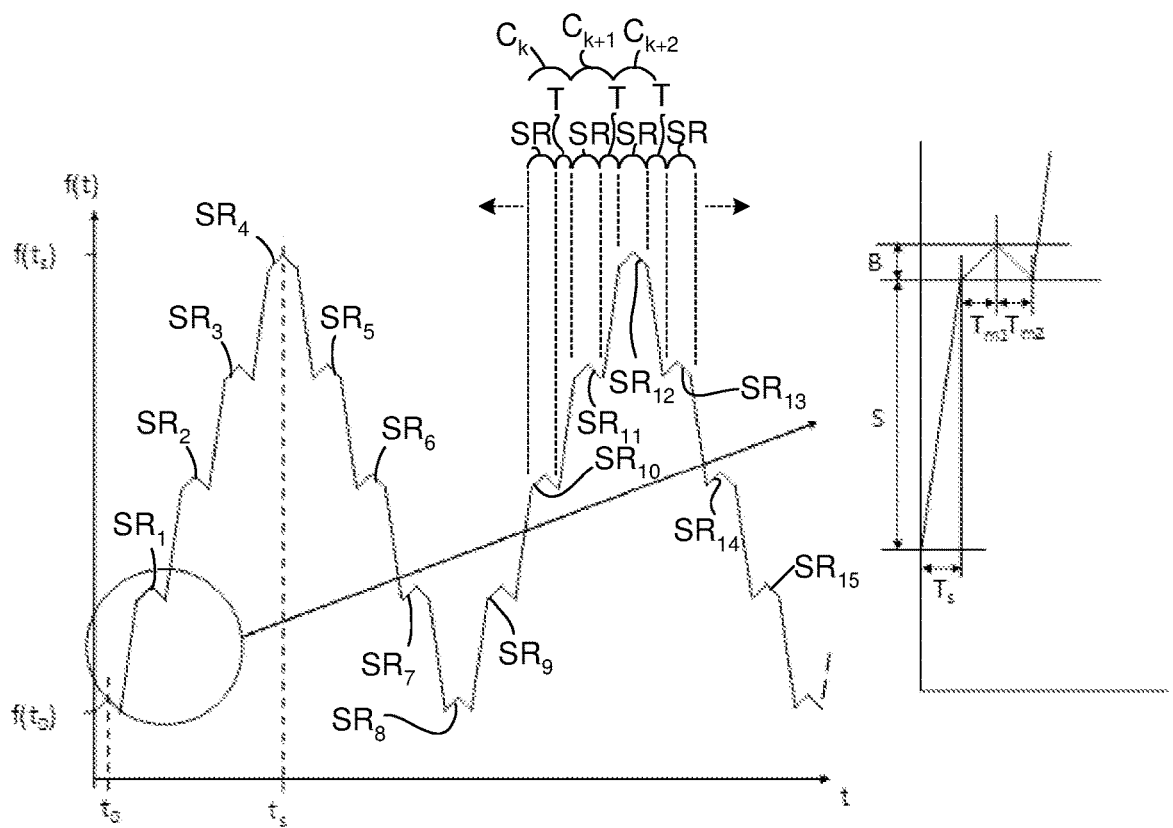
FIG. 13A presents a graph showing an example of the frequency of the LIDAR output signal versus time as the LIDAR output signal is moved to different sample regions in the field of view.

FIG. 13A presents a graph showing an example of the frequency of the LIDAR output signal versus time as the LIDAR output signal is moved to different sample regions in the field of view. The frequency of the LIDAR output signal is shown as a function of time, f(t) and is tuned between $f(t_o)$ and $f(t_s)$. As noted above, the electronics operate the LIDAR chip through a series of cycles. A portion of the cycles that are shown in FIG. 13A are labeled $C_k$. Each cycle includes a transition time labeled "T" and a sample region time labeled "SR."

The transition region times (T) mark the times where the LIDAR output signal is being steered from one sample region to a different sample region. The sample region times (SR) mark the times where the LIDAR output signal is incident on one of the sample regions in the field of view. As a result, the LIDAR data is generated from the LIDAR output signals that are output from the LIDAR chip during the sample region times.

As noted above, each cycle can include multiple periods where LIDAR data is generated. The graph of FIG. 13A illustrates that each sample region time includes a first period and second period although more than two or less than two periods are possible. For instance, the time for one of the cycles is circled in FIG. 13A and blown up on the right of the FIG. 13A image. In the blown up portion of the image, the portion of the time corresponding to the first period is labeled $T_{m1}$ and is labeled portion of the time corresponding to the first period is labeled $T_{m2}$. The frequency of the LIDAR output signal increases during the first period and decreases during the second period; however, the frequency of the LIDAR output signal can be decreased during the first period and increased during the second period. As will be described below, the frequency of the LIDAR output signal need not be changed during different sample periods. For instance, the frequency of the LIDAR output signal can be constant during the first period and/or during the second period.

The change in the frequency of the LIDAR output signal during a sample period can cause the position of the LIDAR output signal on the field of view to change during the sample period. The movement of the LIDAR output signal can be reduced by reducing the duration of the sample period ($T_m$) and/or by reducing the frequency change during the sample period (labeled B in FIG. 13A). In some instances, the duration of one or more sample periods ($T_m$) where the frequency of the LIDAR output signal changes during the sample period is greater than 0.1 µs, 0.25 µs, or 0.5 µs and/or less than 1.0 µs, 2.0µ, or 3.0 µs and/or the frequency change (B) is greater than 0.1 GHz, 1 GHz, or 10 GHz and/or less than 20 GHz, 50 GHz, or 100 GHz.

Figure 13B:
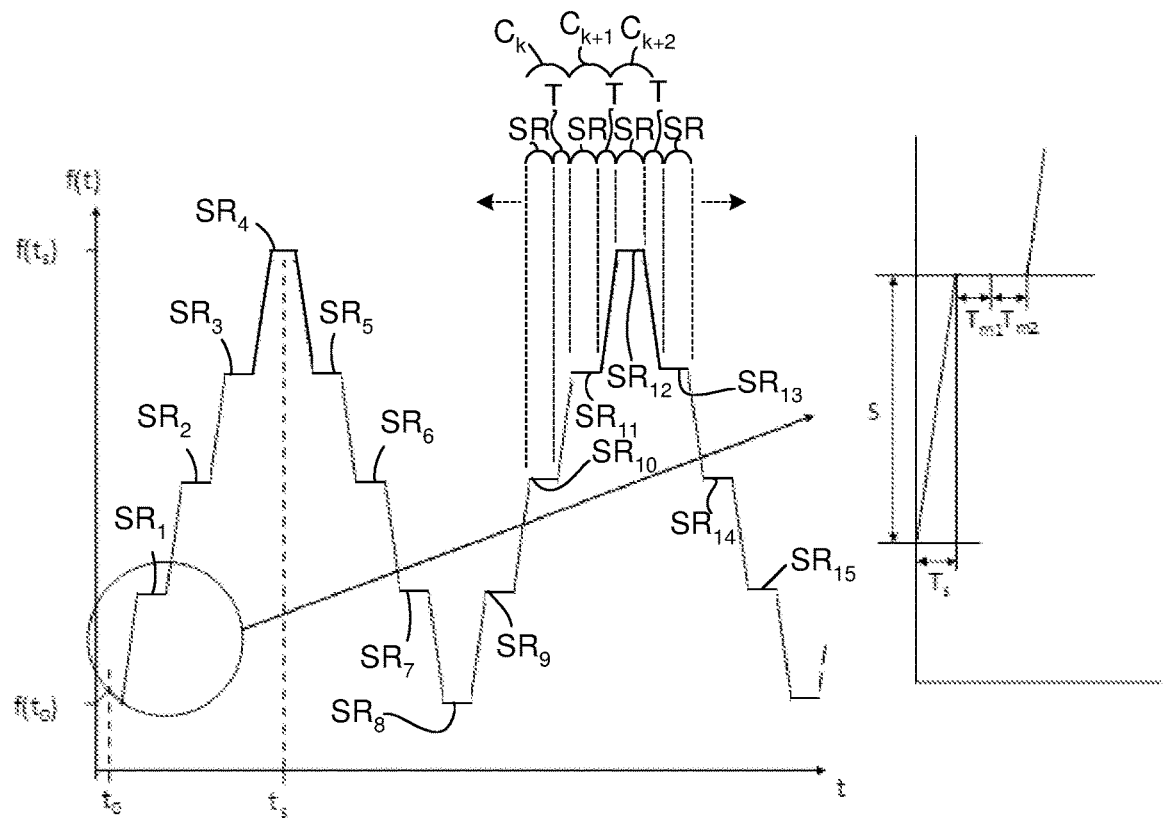
FIG. 13B presents a graph showing an example of the frequency of the LIDAR output signal versus time as the LIDAR output signal is moved to different sample regions in the field of view.

The change in the frequency of the LIDAR output signal during the first period and the second period is suitable for use with a LIDAR system operated as disclosed in the context of FIG. 1 and FIG. 6A through FIG. 6C; however, the frequency of the LIDAR output signal in the LIDAR system disclosed in the context of FIG. 7A and FIG. 7B does not change during the first period and the second period. As a result, a frequency versus time graph that suitable for use with LIDAR system disclosed in the context of FIG. 7A and FIG. 7B may show a constant or substantially constant frequency during sample region time. As an example, FIG. 13B illustrates a frequency versus time graph that may be suitable for use with LIDAR system disclosed in the context of FIG. 7A and FIG. 7B and with the same sample regions associated with FIG. 13A. In FIG. 13B each sample region time includes a first period and second period. The portion of the sample region time corresponding to the first period is labeled $T_{m1}$ and the portion of the sample region time corresponding to the second period is labeled $T_{m2}$. The frequency of the LIDAR output signal is constant during $T_{m1}$ and $T_{m2}$.

Although FIG. 13A and FIG. 13B illustrate the LIDAR output signal in each sample region time as having either a changing frequency or a constant frequency, the frequency of the LIDAR output signal shown in different sample periods of FIG. 13A and FIG. 13B can be combined. For instance, the sample region times can each include a period where the LIDAR output signal has a constant frequency and a period where the LIDAR output signal has a changing frequency. As an example, the LIDAR system can be constructed according to FIG. 7A and FIG. 7B and the first periods can each be a period where the frequency of the LIDAR output signal is constant as shown in FIG. 13B and the second periods can each be a period where the frequency of the LIDAR output signal varies as show in FIG. 13A. During the first periods, the LIDAR system can be generated as disclosed in the context of FIG. 7A and FIG. 7B and during the second periods, the LIDAR data can be generated as disclosed in the context of FIG. 1 or FIG. 6A through FIG. 6C. Alternately, the LIDAR system can be constructed according to FIG. 7A and FIG. 7B and the first periods can each be a period where the frequency of the LIDAR output signal changes as shown in FIG. 13A and the second periods can each be a period where the frequency of the LIDAR output signal is constant show in FIG. 13B. During the second periods, the LIDAR system can be generated as disclosed in the context of FIG. 7A and FIG. 7N and during the first periods, the LIDAR data can be generated as disclosed in the context of FIG. 1 or FIG. 6A through FIG. 6C. In these examples, the distance between the reflecting object and the LIDAR chip can be determined from light signals generated during the first period and the radial velocity can be determined from light signals generated during the second period or the distance between the reflecting object and the LIDAR chip can be determined from light signals generated during the second period and the radial velocity can be determined from light signals generated during the first period.

Figure 14:
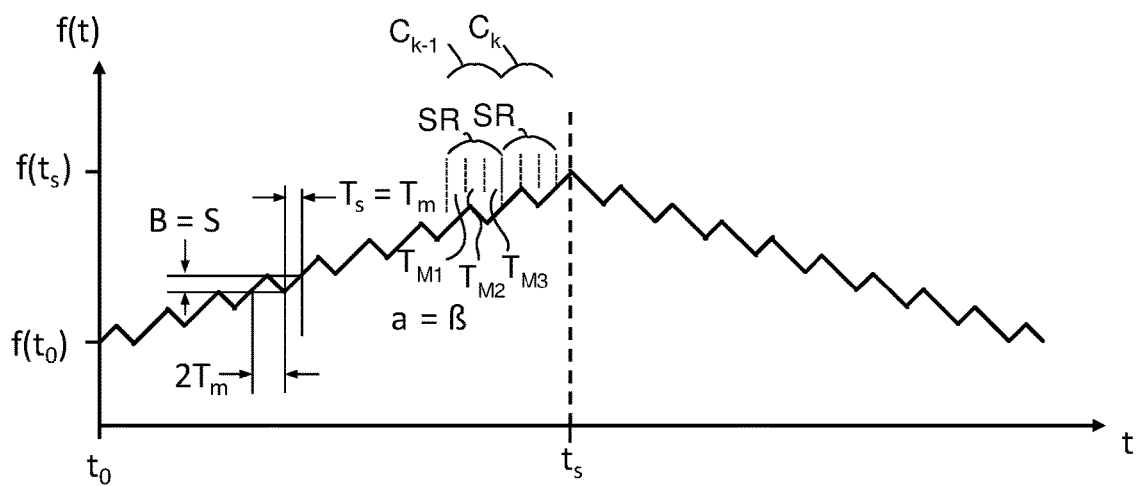
FIG. 14 presents a graph showing an example of the frequency of the LIDAR output signal versus time as the LIDAR output signal is moved to different sample regions in the field of view.

Additionally, the sample region times can include one or more sample period times. For instance, the sample region times can each include only one sample period. Alternately, the sample region times can include three or more sample period times. Accordingly, the sample region times can include one or more periods where the LIDAR output signal has a constant frequency and one or more periods where the LIDAR output signal has a changing frequency. As an example, FIG. 14 illustrates an example of a graph of magnitude versus frequency where two cycles are labeled $C_{k-1}$ and $C_k$. In one embodiment, each of the cycles includes three sample region times. In another embodiment, each of the cycles includes two sample region times ($TM_2$ and $TM_1$ or $TM_3$) and one of the illustrated sample region times ($TM_1$ or $TM_3$) serves as a transition time.

FIG. 13A and FIG. 13B each illustrates the level of movement of the LIDAR output signal during the transition time exceeding the level of movement of the LIDAR output signal during the sample region time. For instance, the change in the frequency during the transition time (labeled S in FIG. 13A and FIG. 13B) is greater than the change in the frequency during the sample region time (labeled B in FIG. 13A and equal to 0 in FIG. 13B). This arrangement is suitable for sample regions that are spaced apart from one another; however, as the sample regions move closer together and/or overlap, the change in the frequency during the transition time (labeled S in FIG. 13A and FIG. 13B) can approach the change in the frequency during the sample region time (labeled B in FIG. 13A and equal to 0 FIG. 13B). In some instances, the LIDAR system is operated so as to exclude a transition time between sample region times. For instance, the cycles labeled $C_k$ and $C_{k-1}$ in the magnitude versus frequency graph shown in FIG. 14 excludes a transition time between sample region times for cycle $C_k$ and cycle $C_{k-1}$.

In some instances, the change in the frequency during the transition time can be the same as the change in the frequency during the sample region time. For instance, as noted above, FIG. 14 can represent embodiments where each of the cycles includes two sample region times ($TM_2$ and $TM_1$ or $TM_3$) and one of the illustrated sample region times ($TM_1$ or $TM_3$) serves as a transition time. In this embodiment of FIG. 14, the change in the frequency during the transition time (labeled S in FIG. 14) is illustrated as the same as the change in the frequency during the sample region time (labeled B in FIG. 13A and equal to 0 FIG. 13B).

In some instances, a ratio of the change in the frequency during the transition time: the change in the frequency during the sample region time is greater than 1:1, 5:1, or 10:1, and/or less than 20:1, 50:1, or 100:1.

The rate at which LIDAR data can be generated for multiple sample regions can be increased by increasing the rate at which the LIDAR output signal is moved from one sample region to another sample region. As a result, the angular scan rate during the transition region times ($dS/dT_s$ in FIG. 13A and FIG. 13B) can be greater than or equal to the angular scan rate during a sample period where the frequency of the LIDAR output signal changes during the sample period ($dB/dT_{M1}$ or $dB/dT_{M2}$ in FIG. 13A). In some instances, a ratio of the angular scan rate during the transition region times ($dS/dT_s$ in FIG. 13A and FIG. 13B): the angular scan rate during a sample period where the frequency of the LIDAR output signal changes is greater than 1:1, 5:1, or 10:1 and/or less than 20:1, 50:1, or 100:1.

In FIG. 13A and FIG. 13B, different sample regions are numbered $SR_1$ through $SR_{15}$. Many of the illustrated sample regions are corresponding sample regions in that they both correspond to the same frequency. FIG. 14 also illustrates corresponding sample regions as the same frequency. In some instances, the LIDAR system is operated such that the corresponding regions on FIG. 13A through FIG. 14 result in the LIDAR output signal being incident on the same sample region of the field of view. For instance, the LIDAR system can be operated such that the LIDAR output signal is incident on the same sample region of the field of view at $SR_1$, $SR_7$, $SR_9$, and $SR_{15}$.

In some instances, the LIDAR system is operated such that at least a portion of the corresponding regions on FIG. 13A and/or FIG. 13B result in the LIDAR output signal being incident on different sample regions in the field of view. For instance, as disclosed above, the LIDAR chip can be used in conjunction with a scanning mechanism that directs the LIDAR output signal to different sample regions in the field of view even though the LIDAR output signal travels away from the chip at the same direction ($\theta$). As a result, the sample regions $SR_1$, $SR_7$, $SR_9$, and $SR_{15}$ can correspond to different sample regions in the field of view even though the value of $\theta$ is the same or substantially the same for each of these sample regions. As an example, the tuning of the frequency of the LIDAR output signal can cause tuning of the LIDAR output signals in a first plane such as a horizontal plane and a scanning mechanism can be employed to tune the LIDAR output signals in a second plane such as a vertical plane. Accordingly, different portions of the sample regions can be included in the same first plane. For instance, the frequency of the LIDAR output signals can be tuned so as to move the LIDAR output signal from $SR_1$ to $SR_2$ to $SR_3$ to $SR_4$ without use of the scanning mechanism. A combination of a scanning mechanism and tuning the frequency of the LIDAR output signals can be used to move the LIDAR output signal from $SR_4$ to $SR_5$. The frequency of the LIDAR output signals can be tuned so as to move the LIDAR output signal from $SR_5$ to $SR_6$ to SR to $SR_8$ without use of the scanning mechanism.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The chip can include components in addition to the illustrated components. As one example, optical attenuators (not illustrated) can be positioned along the first detector waveguide 36 and the second detector waveguide 38. The electronics can operate these attenuators so the power of the first portion of the composite sample signal that reaches the first light sensor 40 is the same or about the same as the power of the second portion of the composite sample signal that reaches the second light sensor 42. The electronics can operate the attenuators in response to output from the first light sensor 40 which indicates the power level of the first portion of the composite sample signal and the second light sensor 42 which indicates the power level of the second portion of the composite sample signal.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
   a LIDAR chip with a waveguide array configured to output a LIDAR output signal such that the LIDAR output signal is reflected by an object located off the LIDAR chip,
      the waveguide array includes multiple steering waveguides that each outputs a different portion of the LIDAR output signal and more than half of the steering waveguides each excludes a phase tuner; and
   electronics configured to tune a wavelength of the LIDAR output signal such that a direction that the LIDAR output signal travels away from the LIDAR chip changes in response to the tuning of the wavelength by the electronics.

2. The system of claim 1, wherein the LIDAR output signal includes light from an outgoing light signal,
   the LIDAR chip is configured to receive a LIDAR input signal, the LIDAR input signal including light from the LIDAR output signal that was reflected off the object, and
   the LIDAR chip is configured to combine light from the LIDAR input signal with light from a reference signal, the reference signal including light from the outgoing light signal but not including light that was reflected off the object.

3. The system of claim 1, wherein the waveguide array includes N steering waveguides that each carries a portion of the LIDAR output signal to a facet, the steering waveguides each being associated with an index j, the index j being an integer from 1 to N, a phase of the portion of the LIDAR output signal carried in steering waveguide j is $f_o+(j-1)f$ at the facet of the steering waveguide, f is the phase differential between neighboring steering waveguides, and $f_o$ is the phase of the portion of the LIDAR output signal in the steering waveguide j=1 at the facet of the steering waveguide j=1.

4. The system of claim 1, wherein the waveguide array includes N steering waveguides that each carries a portion of the LIDAR output signal to a facet, the steering waveguides configured such that a length difference between steering waveguides that are adjacent to one another in the array is a constant for different pairs of steering waveguides that are adjacent to one another in the array.

5. The system of claim 1, wherein the electronics are configured to tune a frequency of the LIDAR output signal such that the LIDAR output signal is directed to different sample regions in a field of view.

6. The system of claim 5, wherein the electronics are configured to generate LIDAR data for each of the sample regions to which the LIDAR output signal is directed, the LIDAR data including a distance and/or a radial velocity between the LIDAR chip and the object.

7. The system of claim 6, wherein a frequency of the LIDAR output signal remains constant while the LIDAR output signal is directed to one of the sample regions.

8. The system of claim 6, wherein the electronics are configured to tune a frequency of the LIDAR output signal while the LIDAR output signal is directed to one of the sample regions.

9. The system of claim 6, wherein a frequency of the LIDAR output signal remains constant for a portion of a time that the LIDAR output signal is directed to a subject one of the sample regions and the electronics are configured to tune a frequency of the LIDAR output signal for another portion of the time that the LIDAR output signal is directed to the subject sample region.

10. The system of claim 1, wherein the waveguide array excludes phase tuners.

11. The system of claim 1, wherein the LIDAR chip includes a splitter that divides an outgoing LIDAR signal into the different portion of the LIDAR output signal and the electronics being configured to tune the wavelength of the LIDAR output signal includes the electronics being configured to tune the wavelength of the outgoing LIDAR signal.

12. The system of claim 11, wherein the electronics being configured to tune the wavelength of the outgoing LIDAR signal includes the electronics being configured to tune an electrical current through a gain medium.

* * * * *